(12) United States Patent
Matsumura et al.

(10) Patent No.: US 12,207,200 B2
(45) Date of Patent: Jan. 21, 2025

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 390 days.

(21) Appl. No.: 17/597,135

(22) PCT Filed: Jun. 28, 2019

(86) PCT No.: PCT/JP2019/025887
§ 371 (c)(1),
(2) Date: Dec. 27, 2021

(87) PCT Pub. No.: WO2020/261551
PCT Pub. Date: Dec. 30, 2020

(65) Prior Publication Data
US 2022/0248335 A1    Aug. 4, 2022

(51) Int. Cl.
*H04B 7/185* (2006.01)
*H04W 52/14* (2009.01)
(Continued)

(52) U.S. Cl.
CPC ....... *H04W 52/143* (2013.01); *H04W 52/244* (2013.01); *H04W 52/367* (2013.01)

(58) Field of Classification Search
CPC . H04W 52/143; H04W 52/244; H04W 52/32; H04W 52/34; H04W 24/10;
(Continued)

(56) References Cited

U.S. PATENT DOCUMENTS

| 11,019,514 | B2 * | 5/2021 | Ayala | H04W 12/03 |
| 2012/0202540 | A1 * | 8/2012 | Lee | H04W 72/541 |
| | | | | 455/501 |

(Continued)

FOREIGN PATENT DOCUMENTS

| JP | 2017510163 A | 4/2017 |
| WO | 2019/092835 A1 | 5/2019 |

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).

(Continued)

*Primary Examiner* — Shantell L Heiber
(74) *Attorney, Agent, or Firm* — Osha Bergman Watanabe & Burton LLP

(57) ABSTRACT

A terminal according to an aspect of the present disclosure includes: a control section that uses a first cell and a second cell of business operators different from each other; and a receiving section that receives downlink transmission having transmission power different depending on at least one of a business operator, frequency, time, and interference in the first cell and the second cell. According to an aspect of the present disclosure, deterioration of communication quality due to interference between networks of different business operators can be suppressed.

5 Claims, 34 Drawing Sheets

(51) Int. Cl.
*H04W 52/24* (2009.01)
*H04W 52/36* (2009.01)

(58) Field of Classification Search
CPC .. H04W 52/243; H04W 52/42; H04B 10/564;
H04B 10/293; H04B 17/345
See application file for complete search history.

(56) References Cited

U.S. PATENT DOCUMENTS

| | | | |
|---|---|---|---|
| 2013/0189999 A1* | 7/2013 | Nakata | H04W 52/40 |
| | | | 455/446 |
| 2015/0223077 A1* | 8/2015 | Fan | H04W 72/30 |
| | | | 370/312 |
| 2016/0366672 A1* | 12/2016 | Papasakellariou | H04W 52/325 |
| 2017/0195979 A1* | 7/2017 | Nakamura | H04W 72/0473 |
| 2018/0220379 A1* | 8/2018 | Zhang | H04W 16/14 |
| 2020/0359338 A1 | 11/2020 | Osawa | |

OTHER PUBLICATIONS

International Search Report issued in International Application No. PCT/JP2019/025887, mailed Jan. 21, 2020 (5 pages).
Written Opinion issued in International Application No. PCT/JP2019/025887; Dated Jan. 21, 2020 (4 pages).
Office Action in the counterpart Japanese Application No. 2021-527289, mailed Jul. 11, 2023 (8 pages).
Office Action issued in counterpart Japanese Patent Application No. 2021-527289 mailed on Dec. 5, 2023 (4 pages).
Office Action issued in Japanese Application No. 2021-527289, mailed Jun. 26, 2024 (6 pages).

\* cited by examiner

[3.7 GHz BAND]

| BUSINESS OPERATOR 1 | BUSINESS OPERATOR 2 | BUSINESS OPERATOR 3 | BUSINESS OPERATOR 4 | BUSINESS OPERATOR 2 |
|---|---|---|---|---|
| 3600MHz – 3700MHz | 3700MHz – 3800MHz | 3800MHz – 3900MHz | 3900MHz – 4000MHz | 4000MHz – 4100MHz |

[4.5 GHz BAND]

| BUSINESS OPERATOR 1 |
|---|
| 4500MHz – 4600MHz |

[28 GHz BAND]

| BUSINESS OPERATOR 3 | BUSINESS OPERATOR 1 | BUSINESS OPERATOR 2 | ⋯ | BUSINESS OPERATOR 4 |
|---|---|---|---|---|
| 27.0GHz – 27.4GHz | 27.4GHz – 27.8GHz | 27.8GHz – 28.2GHz | | 29.1GHz – 29.5GHz |

FIG. 1

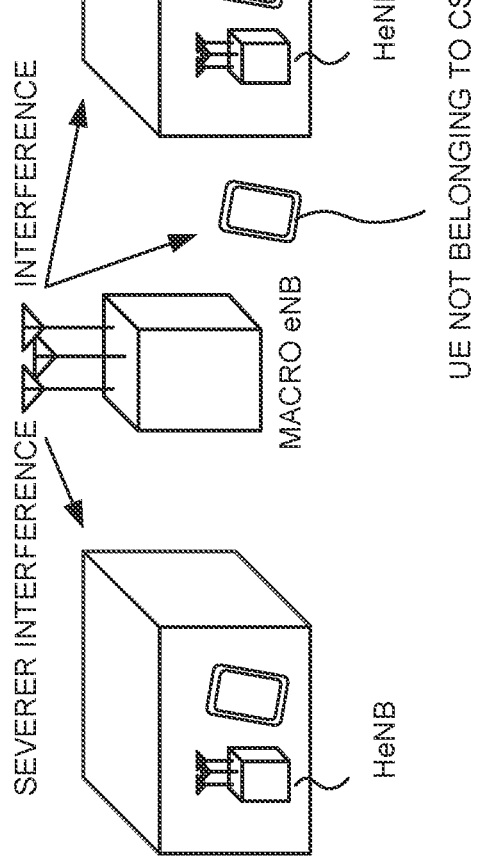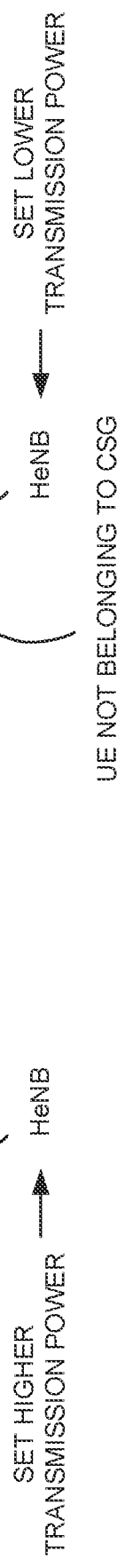
FIG. 13A
FIG. 13B

| DATA CHANNEL/CONTROL CHANNEL [dB] | SPECIFIC TYPE OF DL TRANSMISSION [dB] |
|---|---|
| 0 | 0 |
| -3 | -1 |
| -6 | -2 |
| -9 | -3 |

FIG. 22

| FIELD VALUE | DATA CHANNEL/CONTROL CHANNEL [dB] | SPECIFIC TYPE OF DL TRANSMISSION [dB] |
|---|---|---|
| 00 | 0 | 0 |
| 01 | -3 | -1 |
| 10 | -6 | -2 |
| 11 | -9 | -3 |

FIG. 24

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), studies have been carried out on a system for enabling operation of a 5G system for not only telecommunications carriers (operators) granted license for a given frequency domain but also other business operator than the telecommunications carriers by limiting a condition.

In this case, it is assumed that a plurality of networks of different business operators are operated in a given frequency domain. It is considered that, between the networks operated by different business operators, transmission/reception points (for example, base stations) or the like are deployed without collaborating or cooperating with each other. This may cause mutual interference between the networks of different business operators, deteriorating communication quality.

In the light of this, the present disclosure has one object to provide a terminal and a radio communication method that can suppress deterioration of communication quality due to interference between networks of different business operators.

Solution to Problem

A terminal according to an aspect of the present disclosure includes: a control section that uses a first cell and a second cell of business operators different from each other; and a receiving section that receives downlink transmission having transmission power different depending on at least one of a business operator, frequency, time, and interference in the first cell and the second cell.

Advantageous Effects of Invention

According to an aspect of the present disclosure, deterioration of communication quality due to interference between networks of different business operators can be prevented.

BRIEF DESCRIPTION OF DRAWINGS

FIG. 1 is a diagram to show an example of allocation of frequency bands to business operators;

FIG. 13A and FIG. 13B are each a diagram to show an example of DL power setting;

FIG. 22 is a diagram to show an example of a method of determining a relative value;

FIG. 24 is a diagram to show another example of a method of determining a relative value;

DESCRIPTION OF EMBODIMENTS (Licensed Network and Local Network)

For future radio communication systems (for example, NR, or Rel. 17 or later versions), studies have been carried out on a scheme in which not only a telecommunications carrier (for example, a first business operator) granted license for a given frequency band but also a business operator other than the telecommunications carrier operates a 5G system. For example, such a business operator (for example, a second business operator) other than the telecommunications carrier may be a company or the like that desires to use the technology of 5G for industrial purposes as private radio. A scheme of individually granting license to the second business operator by limiting a communication condition (for example, an area, installation, or the like) has also been under study.

A network operated by the first business operator granted license for a given frequency band (which may be referred to as, for example, a licensed band) may be referred to as a first network, a 5G licensed network, a licensed 5G network, a licensed network, or a telecommunications carrier network.

FIG. 1 is a diagram to show an example of allocation of frequency bands to first business operators. As shown in FIG. 1, it is assumed that license is allocated to a specific business operator in each frequency band. The description herein is given by taking different business operators 1 to 4 as examples of the first business operators. However, the number of business operators or frequency allocation is not limited to the above.

A network operated by the second business operator may be referred to as a second network, a local 5G network, a 5G local network, a local network, an installation limited network, an area limited network, or a non-telecommunications carrier network. In comparison to the first network, the second network may be limited in communication conditions. For example, in comparison to the first network, the second network may have a configuration (for example, installation is possible only indoors) with its installation area of a transmission/reception point (for example, a base station) being limited, or may have a configuration with its transmission power being limited.

Figure 2:
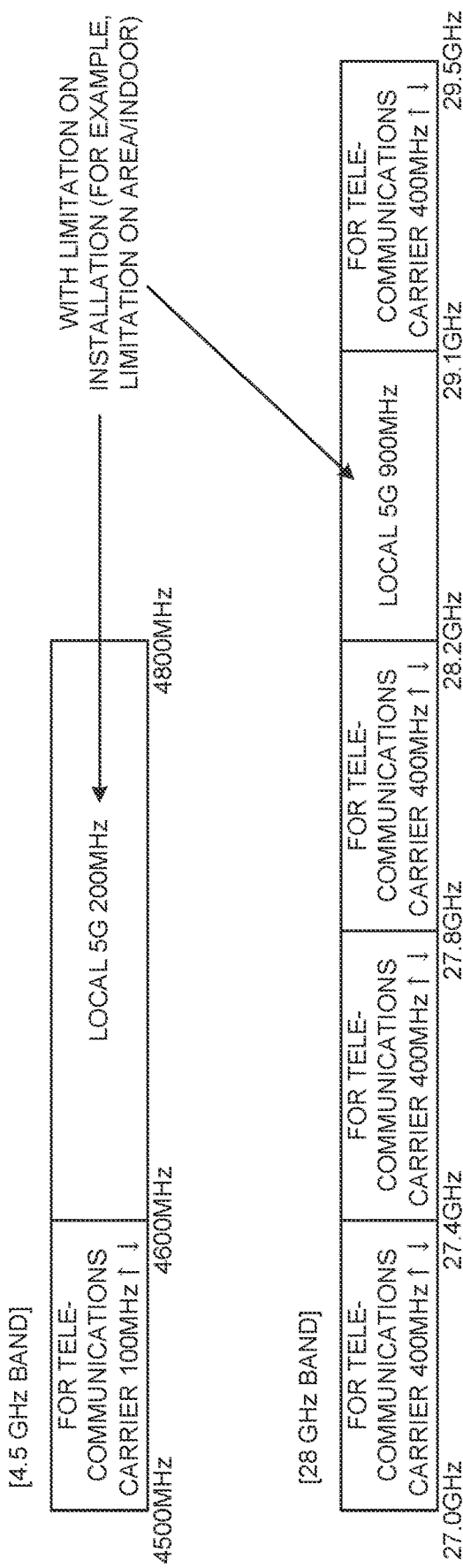
FIG. 2 is a diagram to show an example of a frequency domain to which a local NW is allocated.

FIG. 2 shows an example of an allocated frequency band of a local 5G network operated by the second business operator. The figure shows a case in which a local 5G network is operated in a frequency band that is different from allocated frequency bands for the first business operators (for example, that is contiguous to the allocated frequency band for the first business operator).

Note that the frequency band in which the local 5G network can be operated is not limited to the above. For example, a local 5G network with a limited communication condition may be operated in a frequency band licensed to the first business operators. The local 5G network (second network) may be operated by the first business operator.

The UE connects to at least one of a first network (hereinafter also referred to as a licensed NW) and a second network (hereinafter also referred to as a local NW).

For example, the UE may perform communication (for example, carrier aggregation (CA) or dual connectivity (DC)) by simultaneously connecting to the local NW and the licensed NW. Alternatively, the UE may be configured to be prevented to, during a period in which the UE connects to one NW (for example, the local NW), perform transmission and reception of data in another NW (for example, the licensed NW).

The local NW and the licensed NW may be configured in the same frequency domain or component carrier (CC), or may be configured in different frequency domains or CCs. An unlicensed band may be applied to the local NW.

In this manner, when networks of different business operators are operated in contiguous frequency bands or a common frequency band, interference may occur between the networks. For example, when a common frequency band (or contiguous frequency bands) is applied to the first business operator and the second business operator, interference may occur between the licensed NW and the local NW (see FIG. 3A). FIG. 3A shows an example of a case in which interference occurs between business operator A that operates the licensed NW in a first frequency band (F1) and each of business operators B and C that operate the local NW in at least one of F1 and a second frequency band (F2).

Figure 3B:
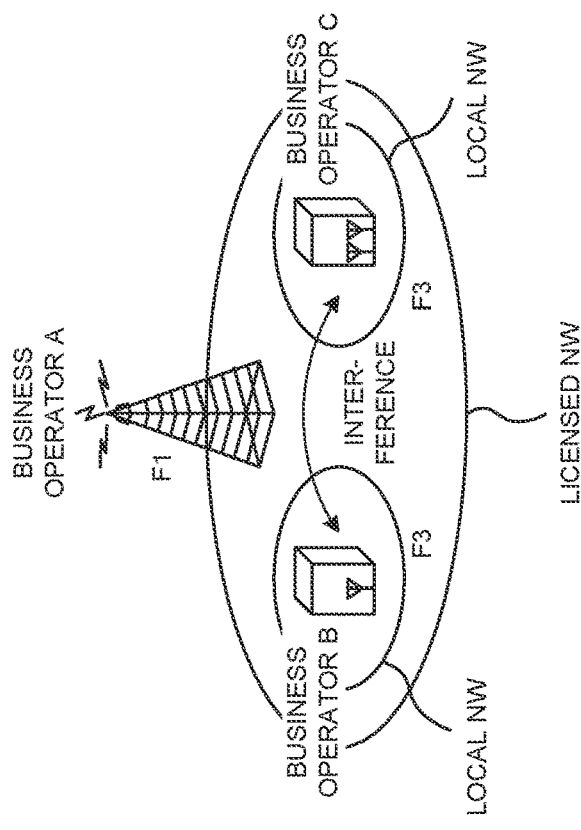
FIG. 3A and FIG. 3B are each a diagram to show an example of interference occurring between NWs of different business operators.
Figure 3A:
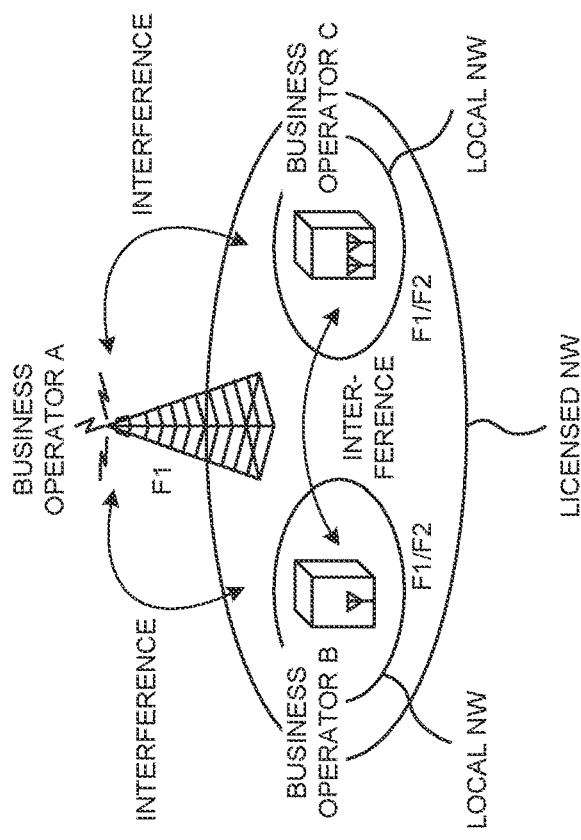

When a common frequency band (or contiguous frequency bands) is applied to the second business operator, interference may occur between the local NWs (see FIG. 3B). FIG. 3B shows an example of a case in which interference occurs between business operators B and C that operate their respective local NWs in a third frequency band (F3).

As shown in FIGS. 3A and 3B, when a plurality of networks (or cells) of different business operators are operated in a common frequency band or contiguous frequency bands, interference from another business operator may occur. In particular, between networks of different business operators, it may be assumed that transmission/reception points (for example, base stations) or the like are deployed without collaborating or cooperating with each other, and thus it is difficult to perform cooperative or collaborative interference control between the different NWs.

Some scenarios of using the licensed NW and the local NW are assumed.

Figure 4:
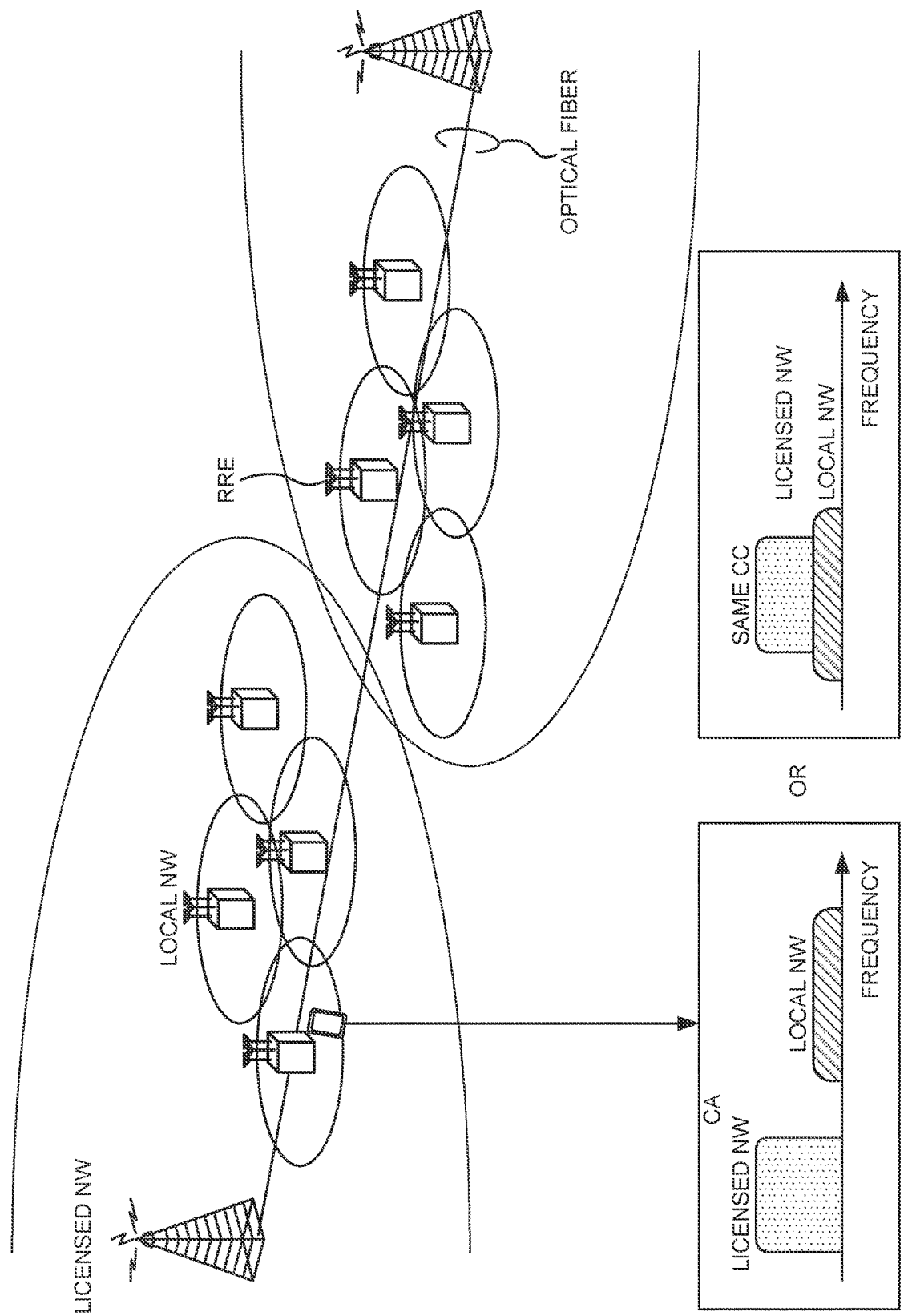
FIG. 4 is a diagram to show an example of CA of a licensed NW and local NWs.

As shown in FIG. 4, CA of a licensed NW and local NWs may be performed. The licensed NW and the local NWs may use different CCs, or the licensed NW and the local NWs may use the same CC.

Figure 5:
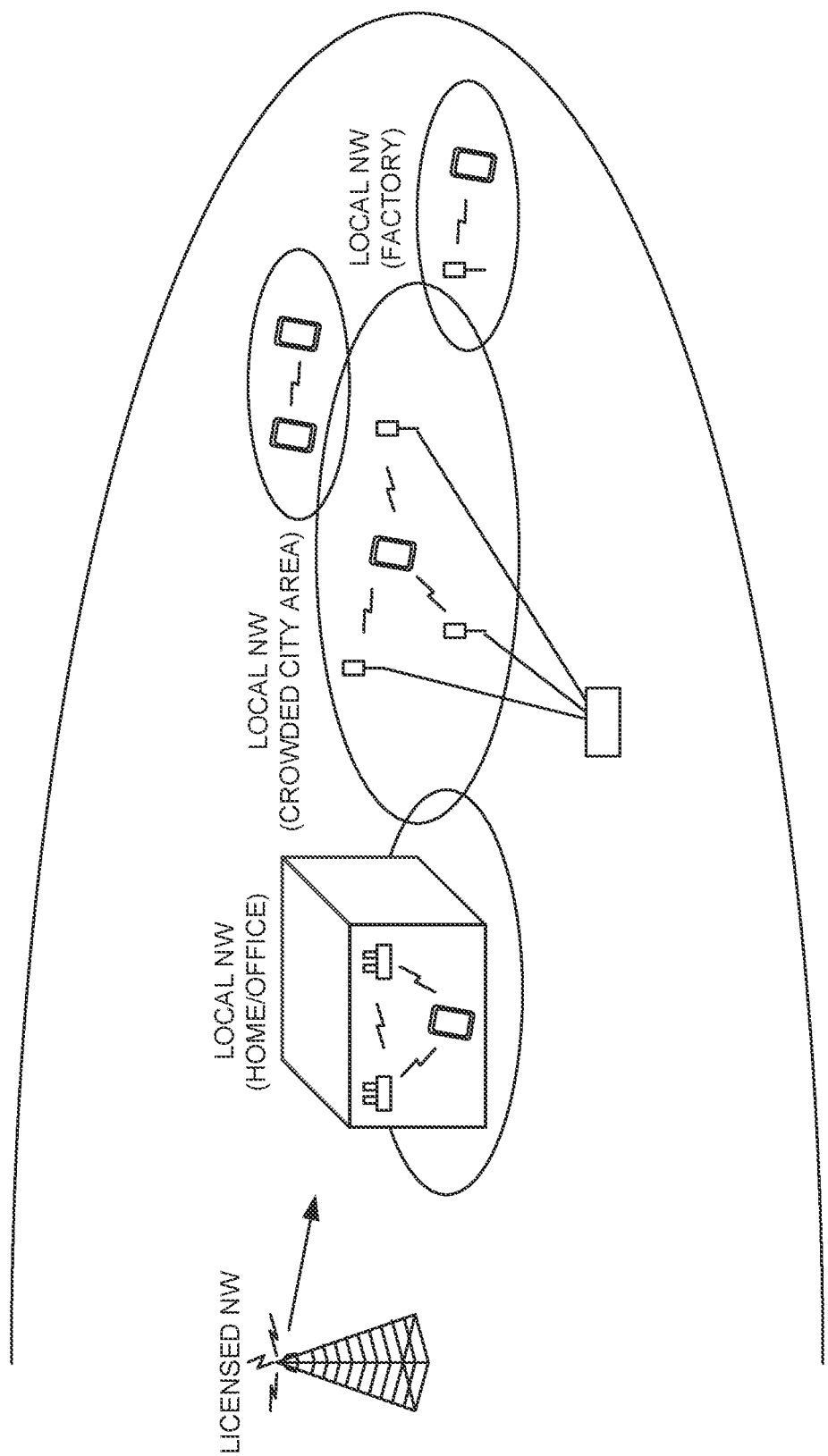
FIG. 5 is a diagram to show an example of scenarios of local NWs.

As shown in FIG. 5, various scenarios in which the local NWs include many low-power nodes or low-power devices are assumed. The licensed NW may assist radio access of the local NWs.

(Interference Control in LTE)

Figure 6:
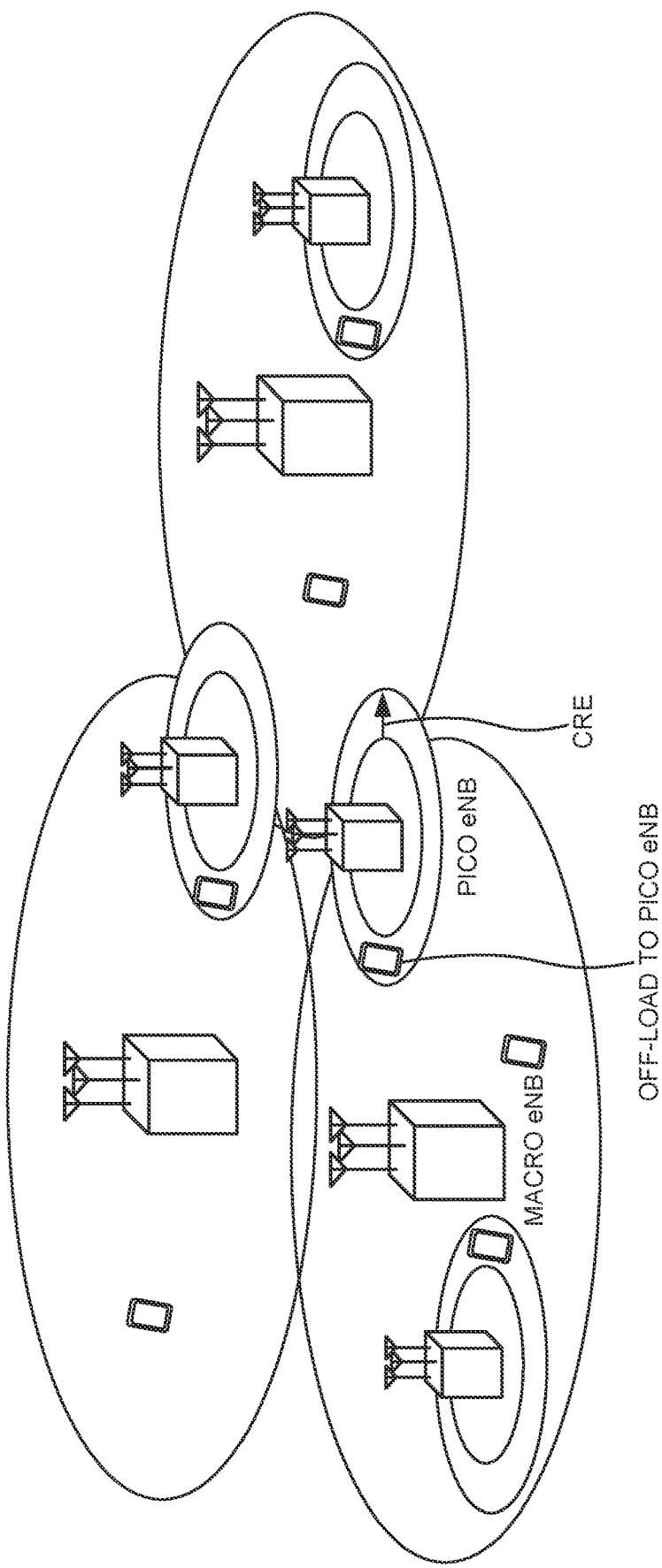
FIG. 6 is a diagram to show an example of CRE.

When UEs connect to a cell having a maximum Reference Signal Received Power (RSRP), the ratio of UEs connecting to a macro cell having high transmission power is increased, and thus traffic is failed to be efficiently off-loaded to small cells. In view of this, LTE uses a Heterogeneous Network (Het Net) configuration that focuses on a local area environment as well as a conventional cellular environment. In general, in a hierarchical network such as Het Net, downlink transmission power of a base station apparatus (macro base station) of a macro cell that covers a relatively large area is configured higher than downlink transmission power of a base station apparatus (a pico base station, a femto base station, a Remote Radio Head (RRH) base station, or the like) of a small cell that covers a relatively small area. For example, Cell Range Expansion (CRE) shown in FIG. 6 increases probability of connection to a small cell by giving an offset to RSRP of the small cell. The offset may be configured using RRC signaling.

According to the CRE, connection to a cell not having optimal RSRP is performed, and thus interference particularly from a macro cell to a small cell is increased.

In LTE, inter-cell interference control (Inter-Cell Interference Coordination (ICIC)) is used. For example, with Fractional Frequency Reuse (FFR) being interference control of the frequency domain, interference for the UE close to a cell boundary is reduced through utilization of reuse of frequency, so as to improve throughput for the UE close to the cell boundary.

Figure 7:
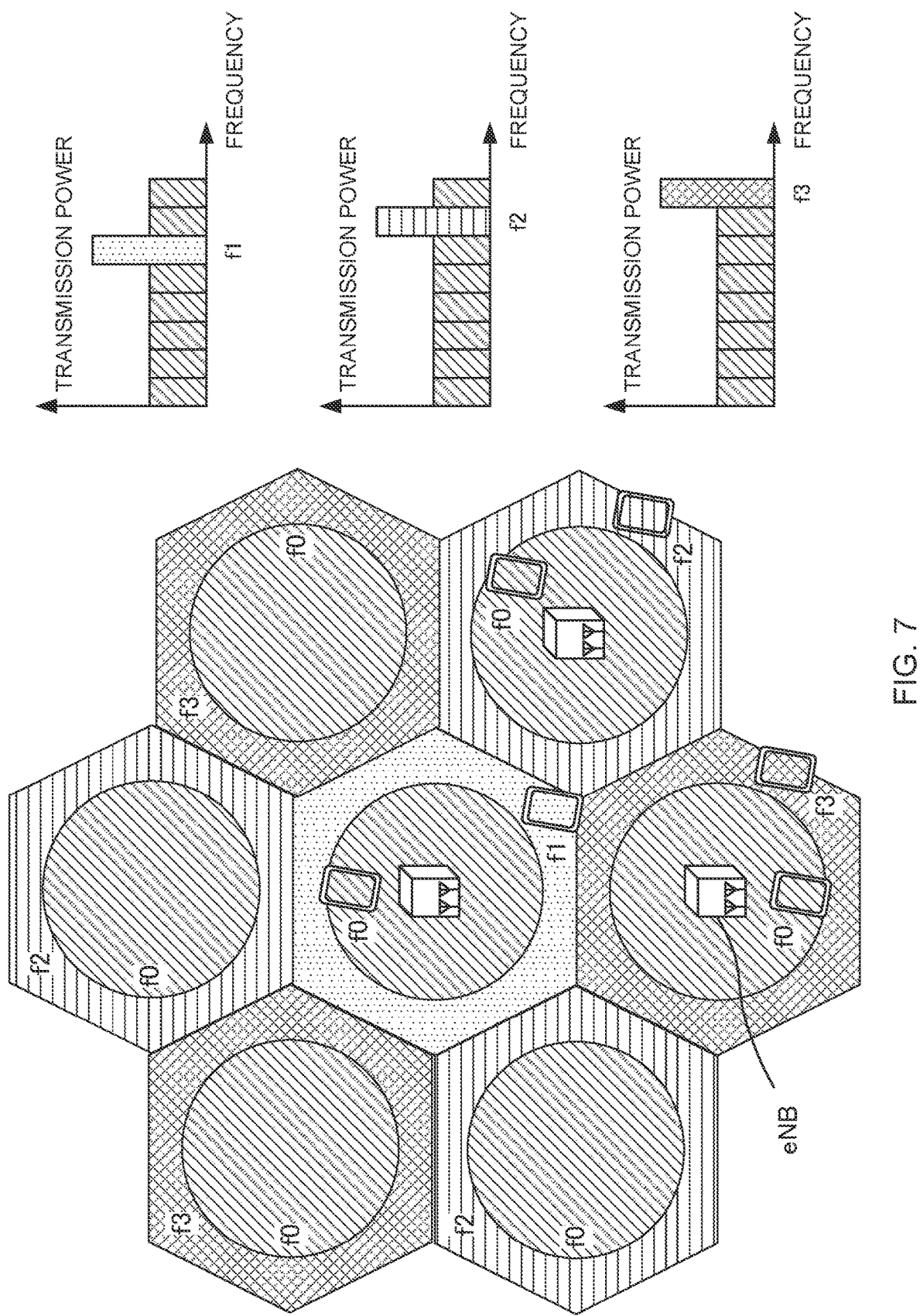
FIG. 7 is a diagram to show an example of FFR.

As shown in FIG. 7, in FFR, a frequency band (a part of a system band, for example, center frequency f0) common between cells is applied to the UE located at the center of each cell, and frequency bands (for example, center frequencies f1, f2, and f3) different between adjacent cells are applied for the UE located at the edge of each cell (cell edge). Between a plurality of frequency bands, transmission power may be different or may be the same.

Figure 8:
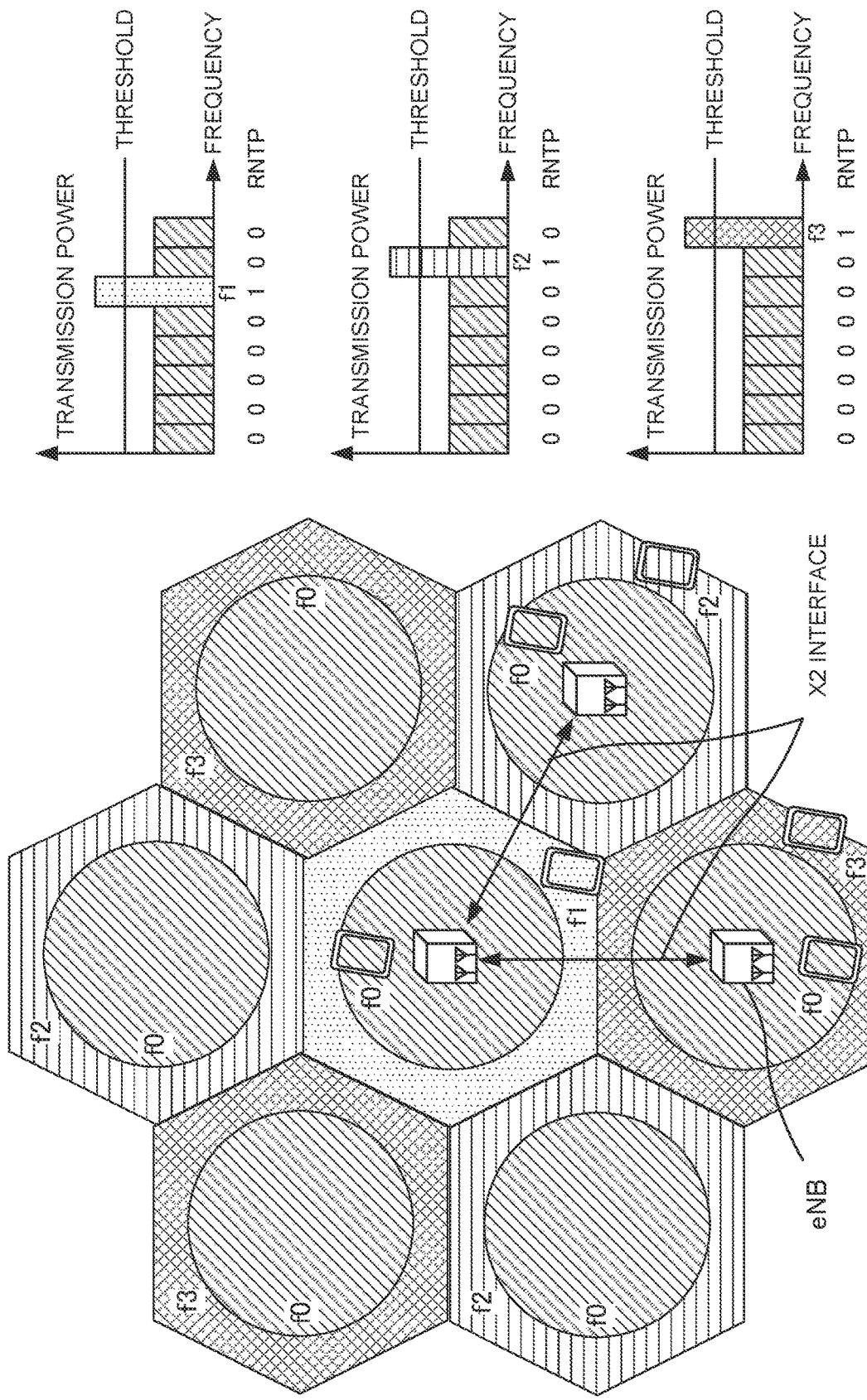
FIG. 8 is a diagram to show an example of RNTP exchange.

As shown in FIG. 8, Relative Narrowband Transmission (Tx) Power (RNTP) is exchanged between a plurality of macro eNBs that perform FFR via a backhaul interface (X2 interface). Each bit of an exchanged bitmap indicates whether or not transmission power of a corresponding resource block (RB) exceeds a threshold configured in advance.

As an interference control of the time domain for the same frequency Het Net, enhanced ICIC (eICIC) is used.

Figure 9:
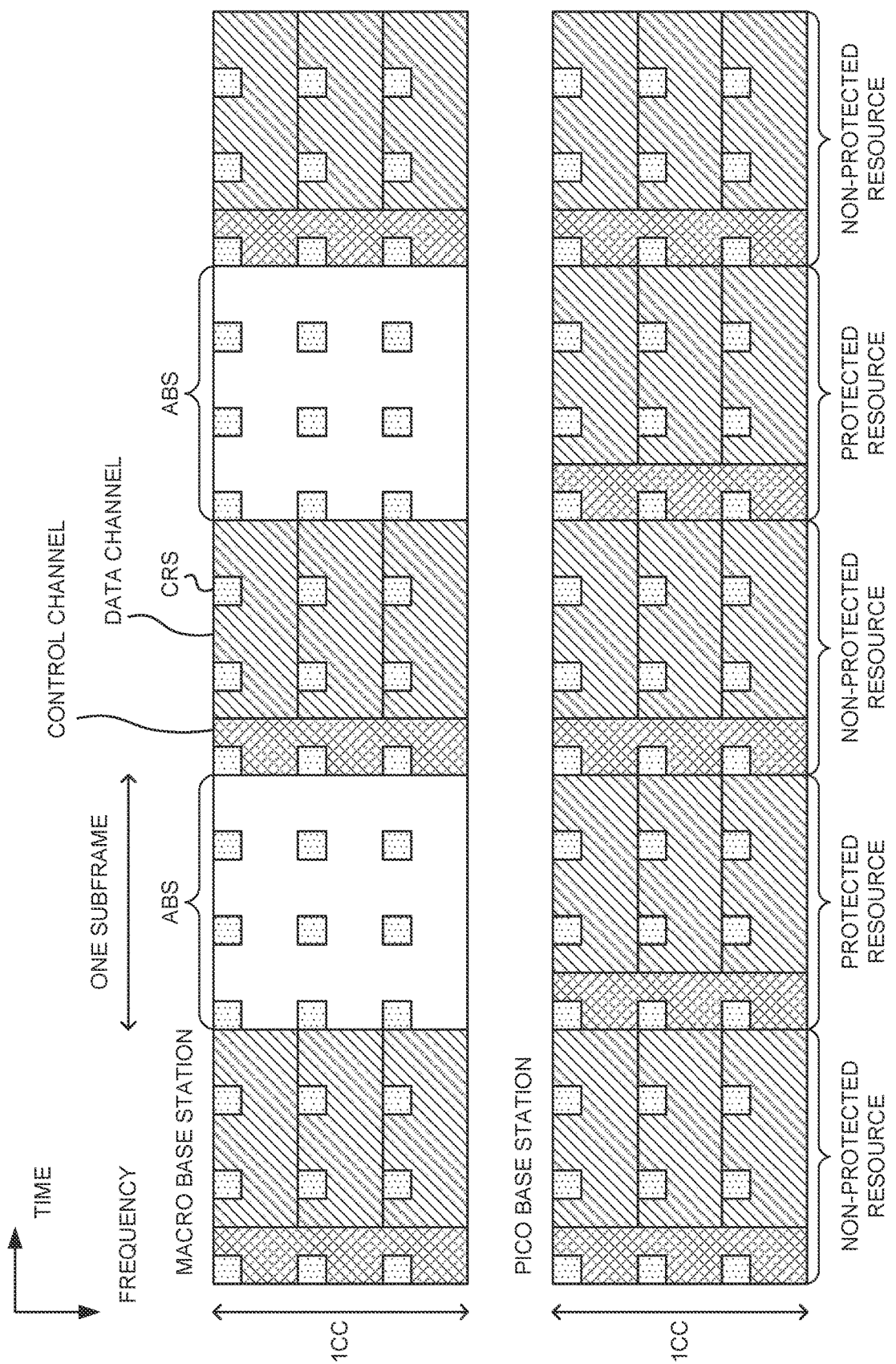
FIG. 9 is a diagram to show an example of ABSs.

Interference from a macro cell is great, and thus by making a signal (cell-specific reference signal (CRS)) of a macro cell of the same frequency in the time domain NULL (blank), interference for a small cell is reduced. In order to reduce interference given to the UE connected to the small cell from the macro cell, transmission is stopped in a part of resources (specific subframe) of the macro cell, or transmission is performed with reduced transmission power. As shown in FIG. 9, Almost Blank Subframes (ABSs) are each a subframe used to transmit only a synchronization signal, control information such as system information, and a CRS, and not to transmit other data signals and an L1/L2 control signal.

In a CC different from a CC in which the ABS is configured, a subframe corresponding to the ABS may be referred to as protected resources. In a CC different from a CC in which the ABS is configured, a subframe corresponding to other than the ABS may be referred to as a non-ABS or non-protected resources. Received quality is significantly different between the ABS and the non-ABS. In order to efficiently perform Adaptive Modulation and channel Coding (AMC) and scheduling control, the UE connected to the small cell needs to feed back CSI of each of the protected resources and the non-protected resources.

A CRS interference canceler cancels interference of two highest cells. For the sake of the CRS interference canceler, the number of neighboring cells, a cell ID, the number of CRS ports, and subframe information are notified to the UE using RRC signaling. A cell receiving interference notifies the UE of an SIB1 using specific RRC signaling.

Figure 10:
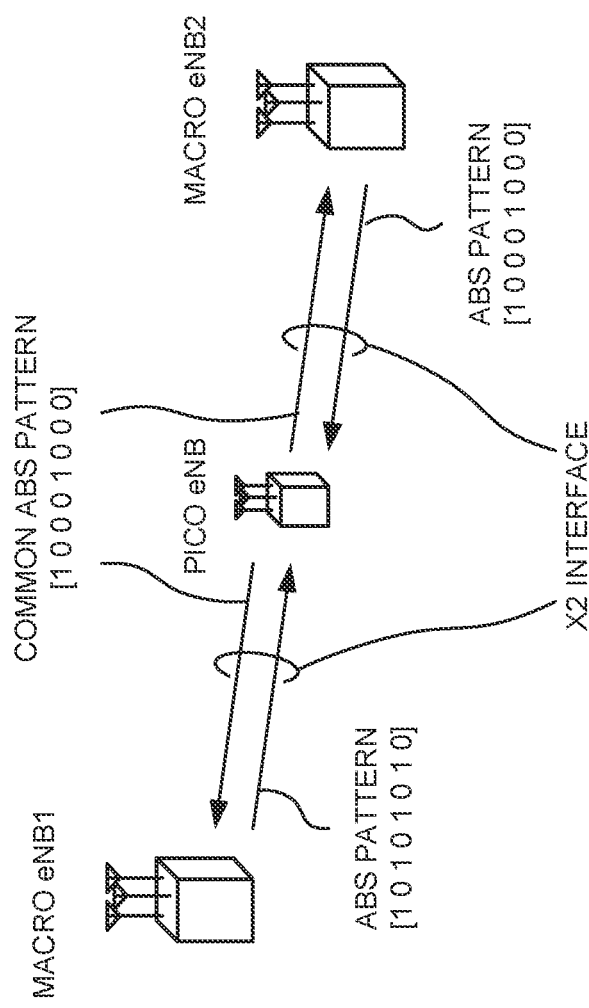
FIG. 10 is a diagram to show an example of a common ABS pattern.

The RNTP is defined only in the frequency domain. The pico eNB needs to know an ABS pattern of the macro eNB giving interference. The ABS pattern is transferred to the macro eNB via the backhaul (X2 interface). As shown in FIG. 10, between a plurality of macro eNBs giving interference to the same pico eNB, in order to integrate the ABS patterns, a common ABS pattern is fed back to the plurality of macro eNBs.

Figure 11:
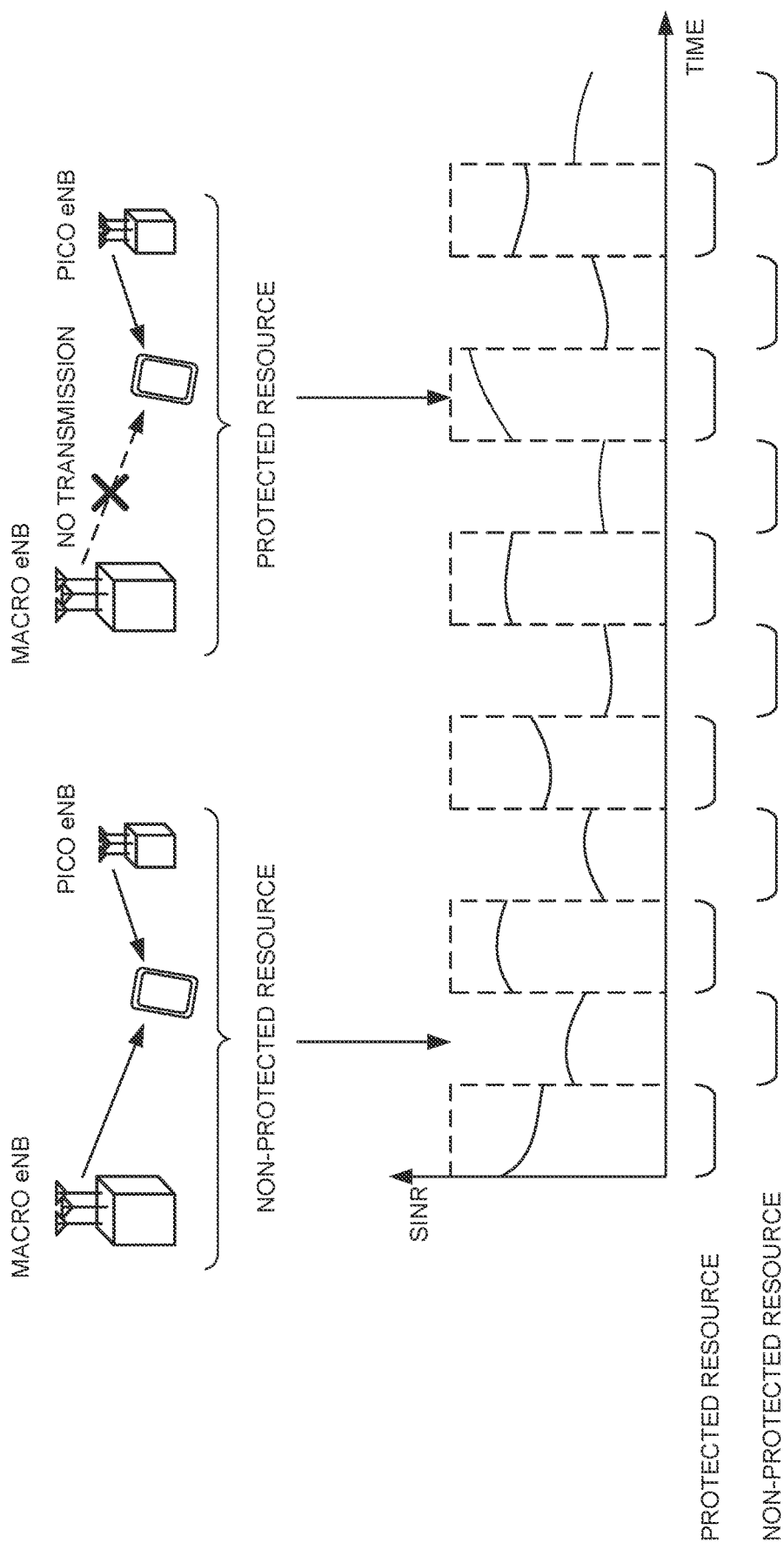
FIG. 11 is a diagram to show an example of measurement in the ABSs.

As shown in FIG. 11, the UE connected to the pico eNB obtains different channel quality levels in subframes of the protected resources and subframes of the non-protected resources. In order for the UE to estimate channel quality information (CQI) for both of the subframes of the protected resources and the subframes of the non-protected resources, measurement resources are transmitted from the pico eNB to the UE connected to the pico eNB.

The ABS includes a CRS that gives interference to the UE connected to the pico eNB having a large CRE offset value.

Figure 12:
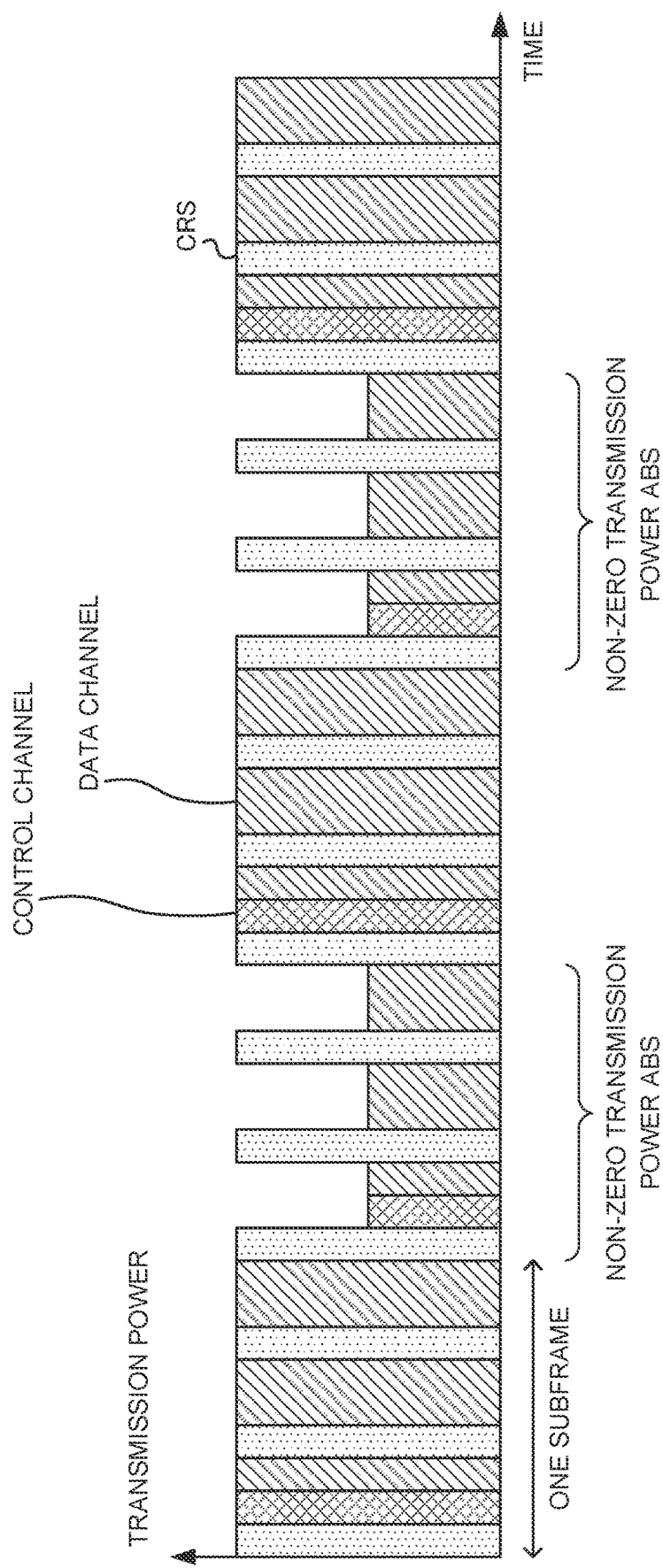
FIG. 12 is a diagram to show an example of non-zero transmission power ABSs.

As a system for coping with the CRS interference, for example, a non-zero transmission power ABS, CRS cancellation in the UE, and transmitter processing (for example, transmission of an interference cell list) have been under study. For example, as shown in FIG. 12, the non-zero transmission power ABSs are each used to, in the ABSs, transmit a control channel and a data channel having different transmission power.

<Femto Cell>

A limited number of UEs can connect to a Home eNB (HeNB, femto cell). Some UEs are required to connect to the macro eNB, even when the HeNB is the best cell.

As shown in FIG. 13A, influence of interference from the HeNB depends on a received signal level from a serving macro eNB. As shown in FIG. 13B, by setting transmission power from the macro eNB according to the received signal level of the HeNB (downlink power setting), the influence is reduced. The control is slow, and may thus be referred to as power setting, instead of transmission power control.

The inventors of the present invention focused on that it is difficult to perform cooperative or collaborative interference control among a plurality of cells of business operators different from each other, and came up with the idea of the invention of the present application through studies of a control method for reducing interference among NWs.

Embodiments according to the present disclosure will be described below in detail with reference to the drawings. The configurations illustrated in respective aspects of embodiments may each be applied individually, or may be applied in combination. Note that a communication system to which the present embodiment can be applied is not limited.

The following description is given by taking a licensed NW and a local NW as examples of networks of different business operators. However, types of the NWs are not limited to the above. The following description is given by taking an example of a plurality of NWs of different business operators. However, the description can also be applied to interference control between NWs of the same business operator.

(Radio Communication Method)

In the present disclosure, networks (NWs) of the same business operator may be interpreted as networks having the same business operator ID. Networks of different business operators may be interpreted as networks having different business operator IDs. Networks of different business operators may be interpreted as networks whose at least cell IDs (virtual cell IDs) are different. Networks of different business operators may be interpreted as networks whose at least transmission resource positions of SSB and broadcast information are different. A network may be interpreted as a cell or a component carrier (CC).

The UE may measure at least one of signal power, interference power, RSRP, RSRQ, SINR, CSI, and CQI of NWs (or cells) having different business operator IDs. A flag (for example, 1 bit) indicating whether or not measurement results are equal to or larger than a given value may be reported. The UE may report the flag as a part of a CSI report to the NW (or cell) having a business operator ID to be connected. Alternatively, the UE may report measurement results of at least one of signal power, interference power, RSRP, RSRQ, SINR, and CQI of NWs (or cells) having different business operator IDs.

The UE may perform cell search in frequency bands (or CCs) of NWs (or cells) having different business operator IDs, or may measure at least one of signal power, interference power, RSRP, RSRQ, SINR, CSI, and CQI. The UE may report the measurement results in frequency bands (or CCs) of NWs (or cells) having the same business operator ID, or may report the measurement results in frequency bands (or CCs) of NWs (or cells) having different business operator IDs.

The UE may use a first cell and a second cell of business operators different from each other (may connect to the first cell and the second cell). The UE may receive downlink transmission having transmission power different depending on at least one of a business operator, frequency, time, and interference in the first cell and the second cell.

In the present disclosure, a cell, a CC, a frequency band, a business operator, and a network (NW) may be interchangeably interpreted as each other.

First Embodiment

Interference control of the frequency domain may be applied to a plurality of cells including at least one of a licensed NW and a local NW. The plurality of cells may correspond to different business operators.

Figure 14:
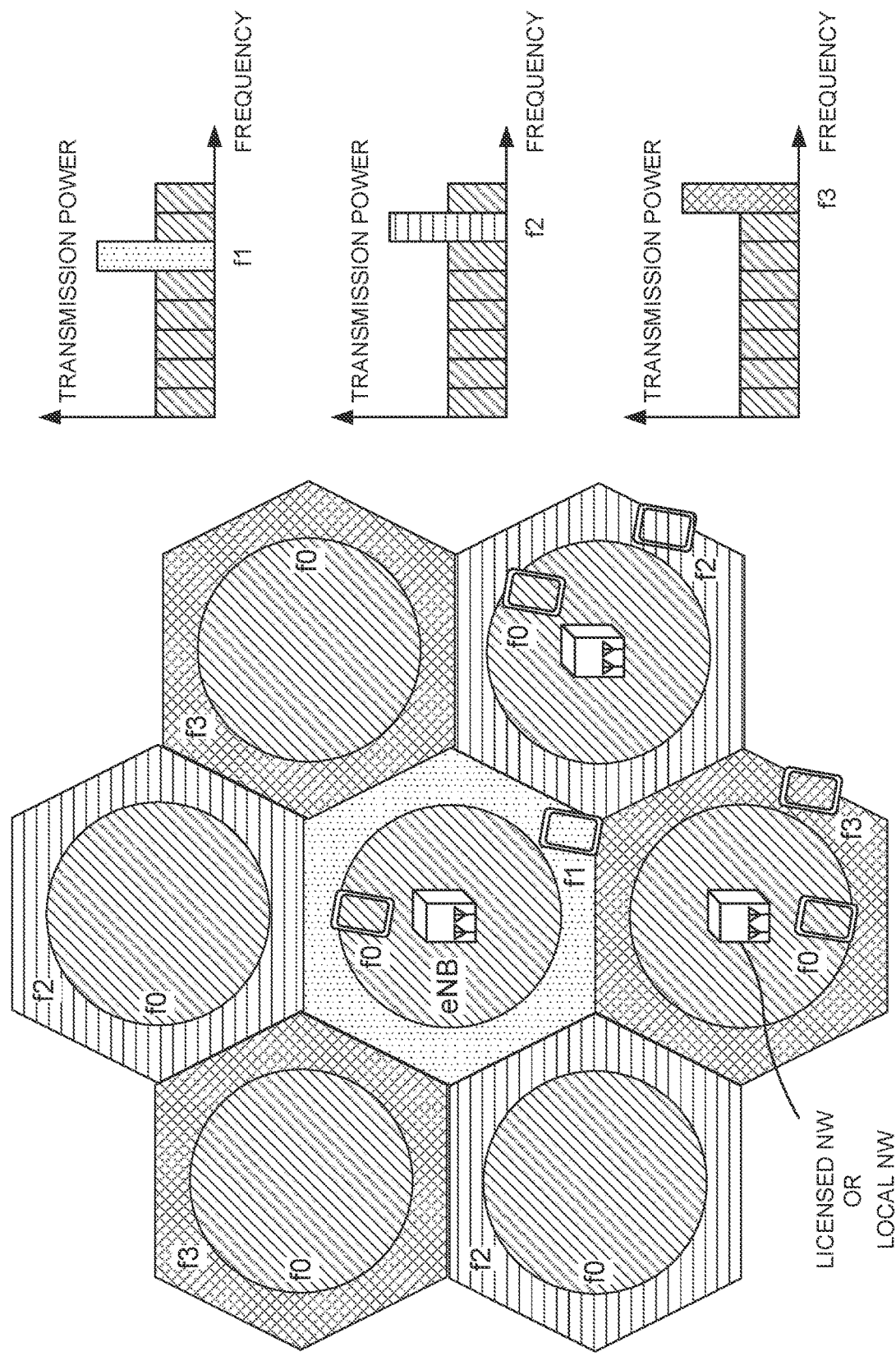
FIG. 14 is a diagram to show an example of FFR according to the first embodiment.

For example, FFR may be applied to a plurality of cells. As shown in FIG. 14, a frequency band (a part of a system band, for example, f0) common between a plurality of cells is applied to the UE located at the center of each cell, and frequency bands (for example, f1, f2, and f3) different for each cell are applied for the UE located at the edge of each cell (cell edge). Between a plurality of frequency bands, transmission power may be different or may be the same.

FFR may be at least one of the following FFRs 1 and 2.

<<FFR 1>>

Figure 15:
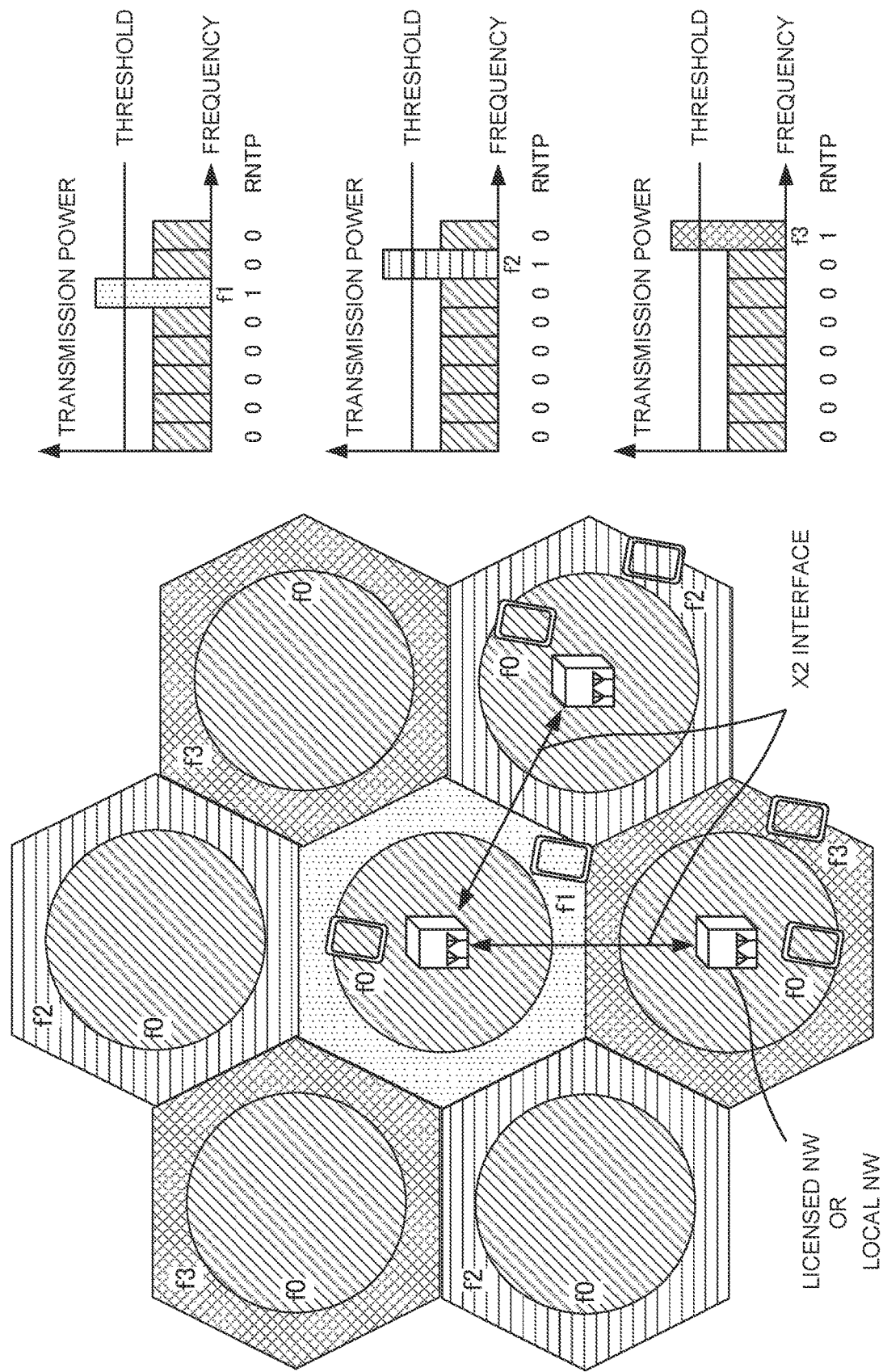
FIG. 15 is a diagram to show an example of RNTP exchange according to the first embodiment.

FFR (DL FFR) may be applied to DL transmission of a plurality of cells. As shown in FIG. 15, between a plurality of the base stations of the cells, RNTP may be exchanged via the backhaul interface (for example, the X2 interface). Each bit of an exchanged bitmap may indicate whether or not transmission power for a corresponding RB exceeds a threshold configured in advance.

<<FFR 2>>

Figure 16:
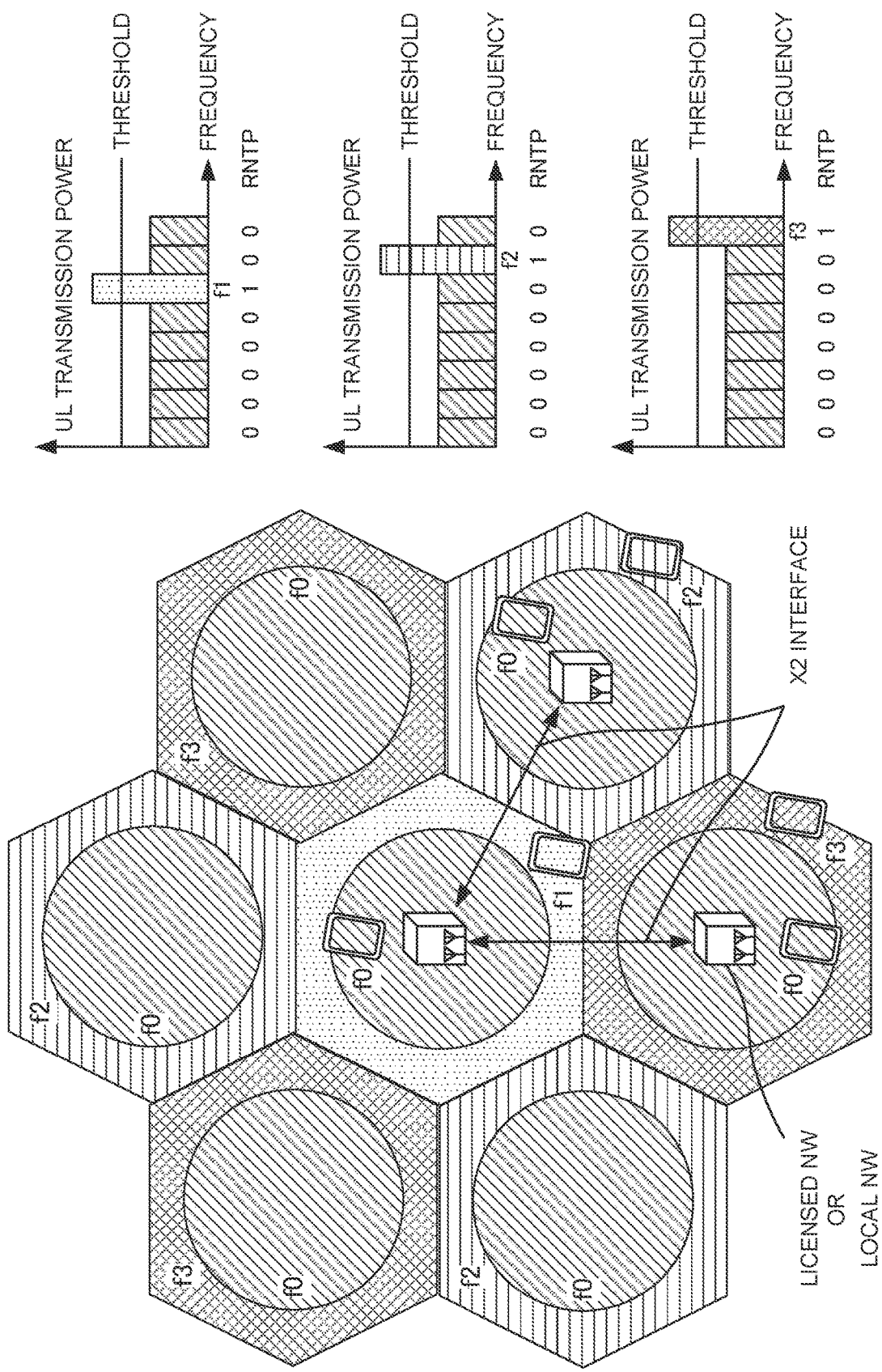
FIG. 16 is a diagram to show an example of FFR for UL transmission.

FFR (UL FFR) may be applied to UL transmission of a plurality of cells. As shown in FIG. 16, between a plurality of frequency bands, UL transmission power may be different or the same.

Transmission power different depending on frequency may be defined in a specification, or may be configured using higher layer signaling. Frequency may be interpreted as an RE, a PRB, a bandwidth part (BWP), or the like. Transmission power may be interpreted as maximum transmission power, maximum output power, transmission power density (power spectrum density), transmission power, or the like.

For example, a value of $P_{CMAX}$ different depending on frequency may be defined in one CC. For example, the transmission power density may be defined by an expression different depending on frequency. A transmission power control (TPC) parameter used for calculation of the transmission power density may be defined by an expression different depending on frequency. The TPC parameter may be at least one of P0 and α.

Between a plurality of the base stations of cells, RNTP may be exchanged via the backhaul interface (X2 interface).

Transmission power of the UE at the cell edge may be higher than transmission power of the UE at the cell center. In this case, quality of UL transmission of the UE at the cell edge of the cell in question can be improved. Transmission power of the UE at the cell edge may be lower than transmission power of the UE at the cell center. In this case, interference given to other cells can be reduced, and quality of UL transmission of the UE of other cells can be improved.

According to the present embodiment, throughput of the UE at the cell edge can be improved.

Second Embodiment

Interference control of the time domain may be applied to a plurality of cells including at least one of a licensed NW and a local NW. The plurality of cells may correspond to different business operators.

When a plurality of cells perform DL transmission in one frequency band, the interference control of the time domain may be applied to the plurality of cells.

Limited periods may be used as the interference control of the time domain. Each of the limited periods may be a slot, may be a sub-slot shorter than a slot, or may be a symbol. A limited period, a blank period, a muting period, and an almost blank slot/sub-slot/symbol (ABS) may be interchangeably interpreted as each other. In the limited period, only a specific type of DL transmission may be performed, and DL transmission other than the specific type of DL transmission need not be transmitted. The specific type of DL transmission may be at least one signal or channel of a synchronization signal (SS) block (SSB, SS/physical broadcast channel (PBCH) block), a synchronization signal, control information such as system information (for example, a system information block (SIB)), a channel state information-reference signal (CSI-RS), and a tracking reference signal (TRS).

The DL transmission other than the specific type of DL transmission may be referred to as a non-specific type of DL transmission. For example, the non-specific type of DL transmission may be at least one of an L1/L2 control signal, a data signal, a control channel, a data channel, a PDCCH, and a PDSCH.

A period other than the limited period may be referred to as a non-limited period.

In a cell (interfered cell) other than a cell (interfering cell in which the limited period is configured, resources (time resources and frequency resources) corresponding to the limited period may be referred to as protected resources. In the protected resources, the non-specific type of DL transmission may be performed. A period corresponding to the limited period in the interfered cell may be referred to as a protected period. A protected resource, a protected period, a protected slot, a protected sub-slot, a protected symbol, a protected CC, and a protected BWP may be interchangeably interpreted as each other. In the interfered cell, a period corresponding to other than the limited period may be referred to as a non-protected period.

For the limited period, at least one of time domain interference control methods 1 to 11 may be applied.

<<Time Domain Interference Control Method 1>>

For each ID of at least one of the business operator, the CC, and the BWP, the limited period may be configured. The UE may be configured with a limited period for a specific value out of some of the IDs. The ID may correspond to a licensed cell or a local cell.

The UE may be notified of an index indicating the limited period for the value of the ID, by using at least one of higher layer signaling and the MAC CE. The UE may be notified of the value of the ID that uses the limited period for the index indicating the limited period, by using at least one of higher layer signaling and the MAC CE. The index indicating the limited period may be an index indicating a pattern of the limited period, or may be at least one of a slot index, a sub-slot index, and a symbol index corresponding to the limited period.

The specific type of DL transmission may be one of the following DL transmissions 1 and 2.

[DL Transmission 1]

The specific type of DL transmission may include at least one of a periodic (P) CSI-RS, a semi-persistent (SP) CSI-RS, and a TRS.

Figure 17:
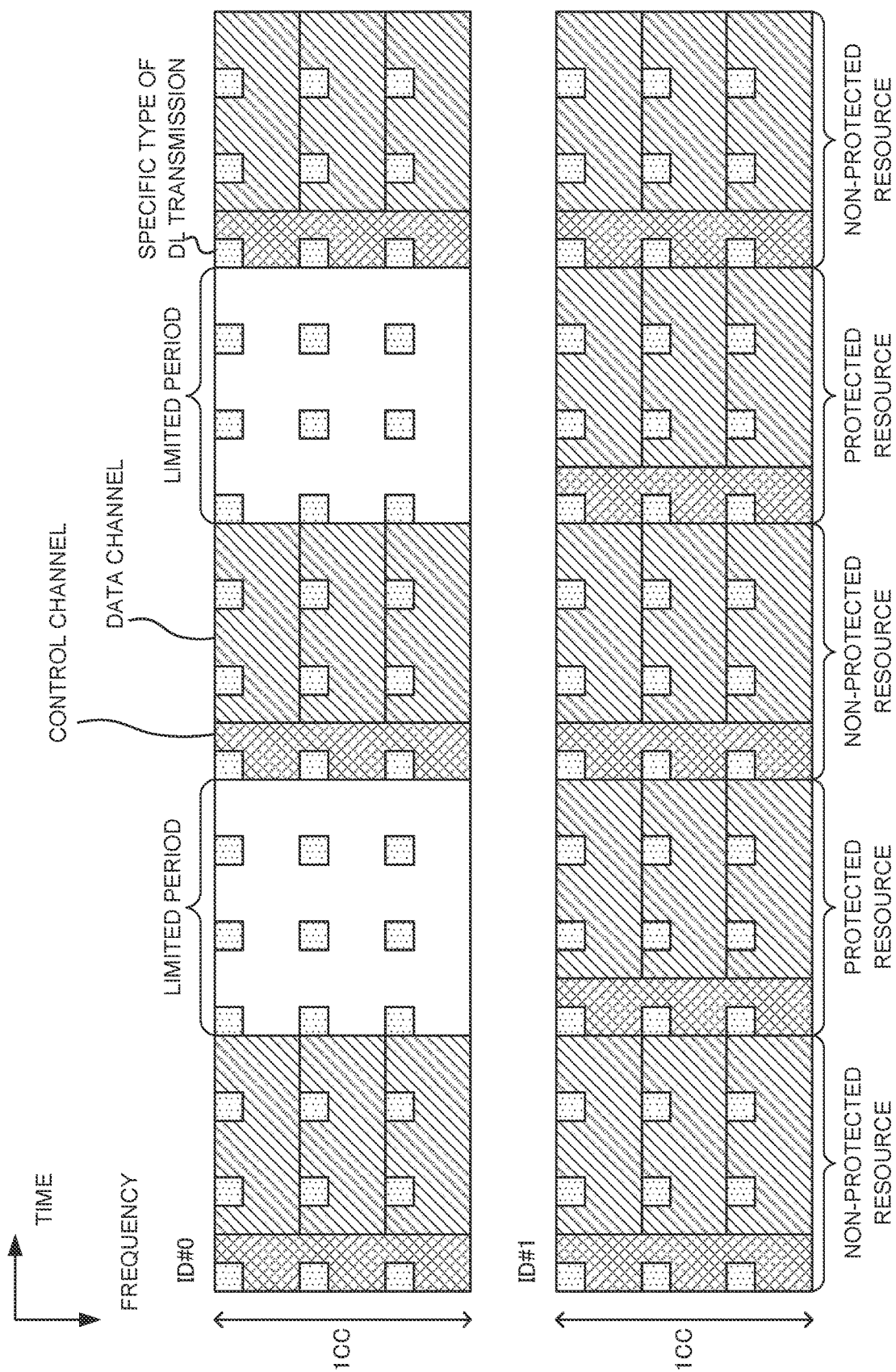
FIG. 17 is a diagram to show an example of limited periods.

For example, as shown in FIG. 17, in the CC corresponding to ID #0, in a slot with the non-limited period, the specific type of DL transmission including an SSB, a CSI-RS, and a TRS, transmission of a control channel (L1/L2 control signal), and transmission of a data channel (data signal) are performed, whereas in a slot with the limited period, only the specific type of DL transmission is performed.

In the CC corresponding to ID #1, the specific type of DL transmission, transmission of an L1/L2 control signal, and transmission of a data signal may be performed.

[DL Transmission 2]

The specific type of DL transmission need not include a periodic (P) CSI-RS, a semi-persistent (SP) CSI-RS, and a TRS. The specific type of DL transmission may be at least one of an SSB, a synchronization signal, and system information.

Figure 18:
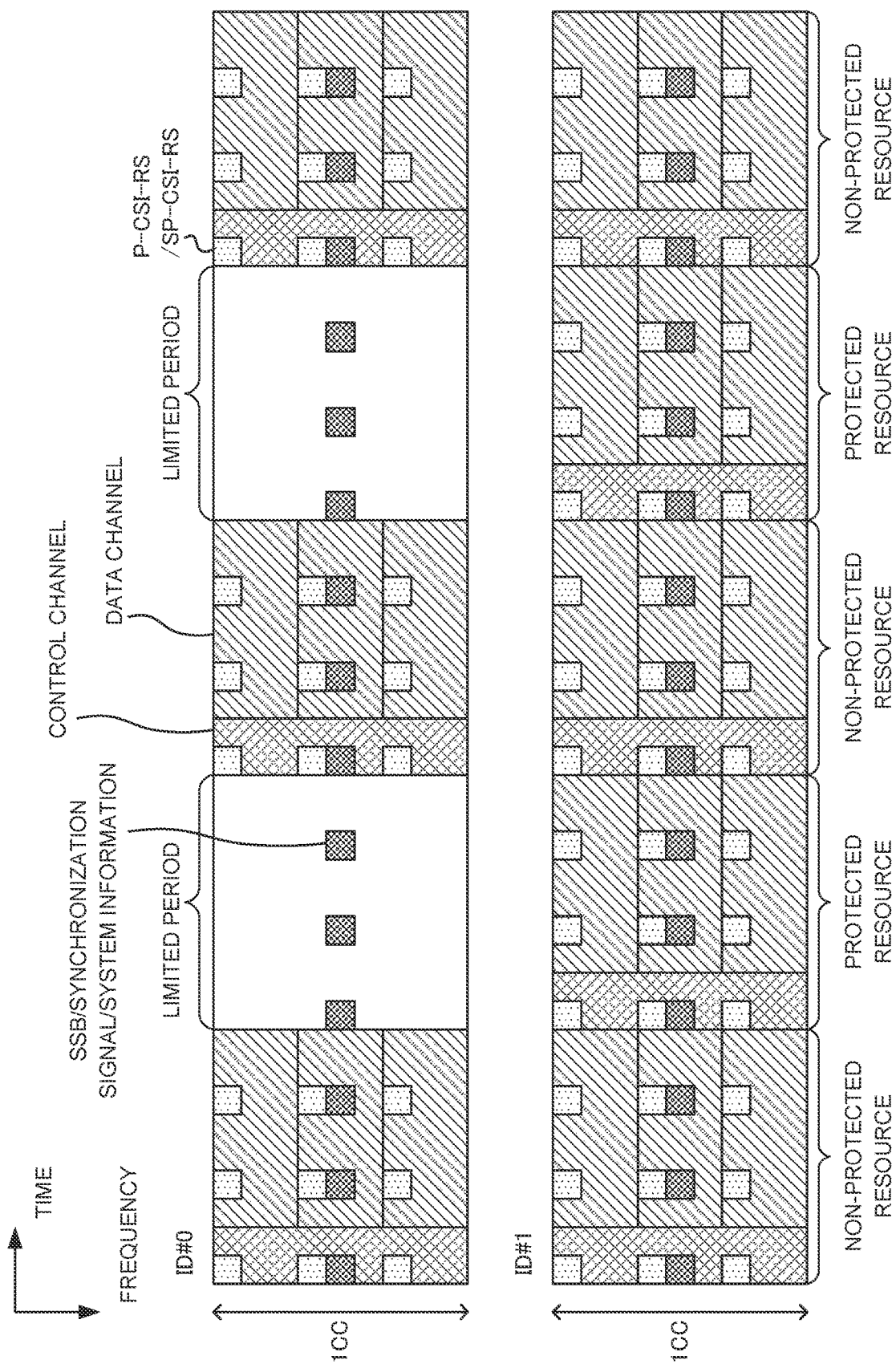
FIG. 18 is a diagram to show an example of a specific type of DL transmission.

For example, as shown in FIG. 18, in the CC corresponding to ID #0, in a slot with the non-limited period, the specific type of DL transmission including an SSB and system information, transmission of a control channel, and transmission of a data channel are performed, whereas in a slot with the limited period, only the specific type of DL transmission is performed.

By limiting the specific type of DL transmission to DL transmission necessary for the UE to connect to a cell, interference can be reduced.

<<Time Domain Interference Control Method 2>>

Power for target DL transmission in the limited period may or may not be 0. The target DL transmission may be the non-specific type of DL transmission (for example, at least one of an L1/L2 control signal, a data signal, a PDCCH, and a PDSCH).

A relative value between the power for the target DL transmission in the limited period and the power for the specific type of DL transmission may be defined in a specification, or may be configured using at least one of higher layer signaling and broadcast information. The power may be transmission power, or may be received power. Power, energy, and energy per resource block (EPRE) may be interchangeably interpreted as each other. The relative value may be a difference, or may be a ratio.

Figure 19:
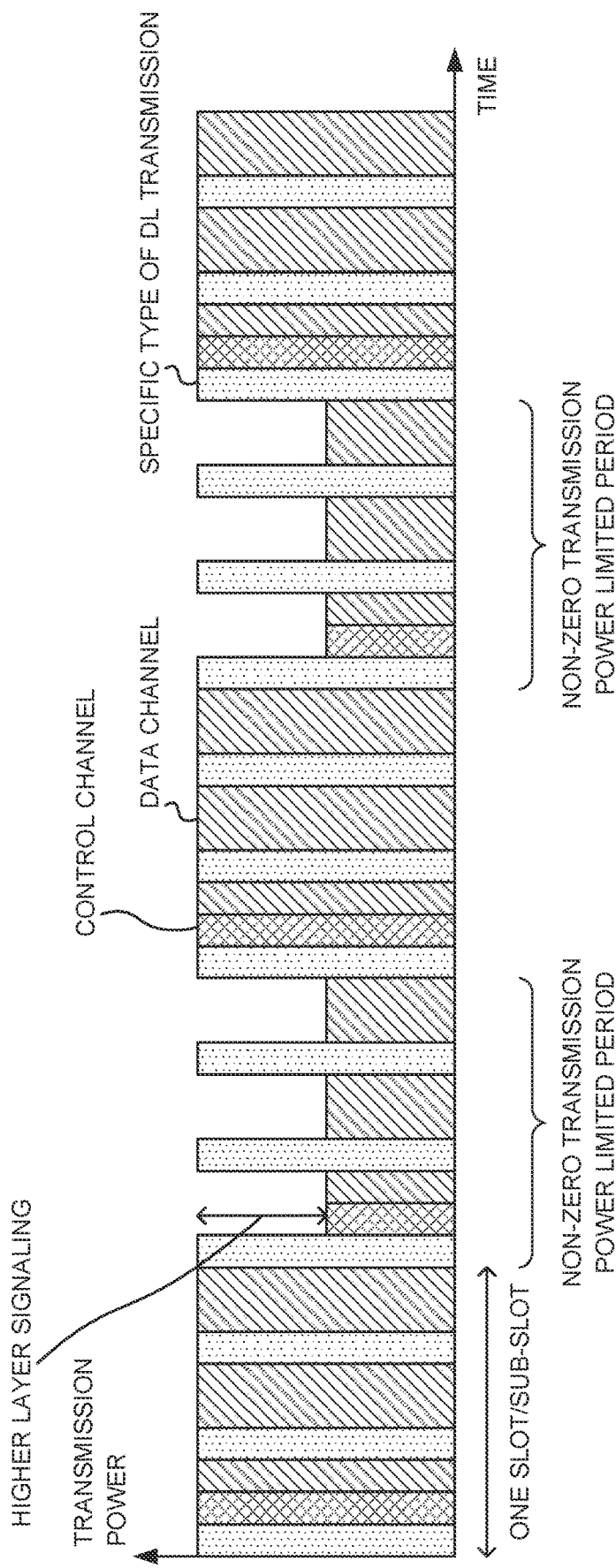
FIG. 19 is a diagram to show an example of a ratio of transmission power for the specific type of DL transmission to transmission power for target DL transmission in the limited period.

As shown in FIG. 19, a parameter indicating a ratio (reduced quantity) of transmission power for the specific type of DL transmission to transmission power for the target DL transmission in the limited period may be configured using higher layer signaling.

A relative value between the power for the target DL transmission in the limited period and the power for the target DL transmission in the non-limited period may be defined in a specification, or may be configured using at least one of higher layer signaling and broadcast information.

<<Time Domain Interference Control Method 3>>

The power for the specific type of DL transmission in the limited period and the power for the specific type of DL transmission in the non-limited period may be different from each other. The power for the specific type of DL transmission in the limited period (limited period in the interfering cell) may be different from the power for the specific type of DL transmission in the protected resources (period corresponding to the limited period in the interfered cell).

A relative value between the power for the specific type of DL transmission in the non-limited period and the power for the specific type of DL transmission in the limited period may be defined in a specification, or may be configured using at least one of higher layer signaling and broadcast information. The power may be transmission power, or may be received power. Power, energy, and EPRE may be interchangeably interpreted as each other. The relative value may be a difference, or may be a ratio.

Figure 20:
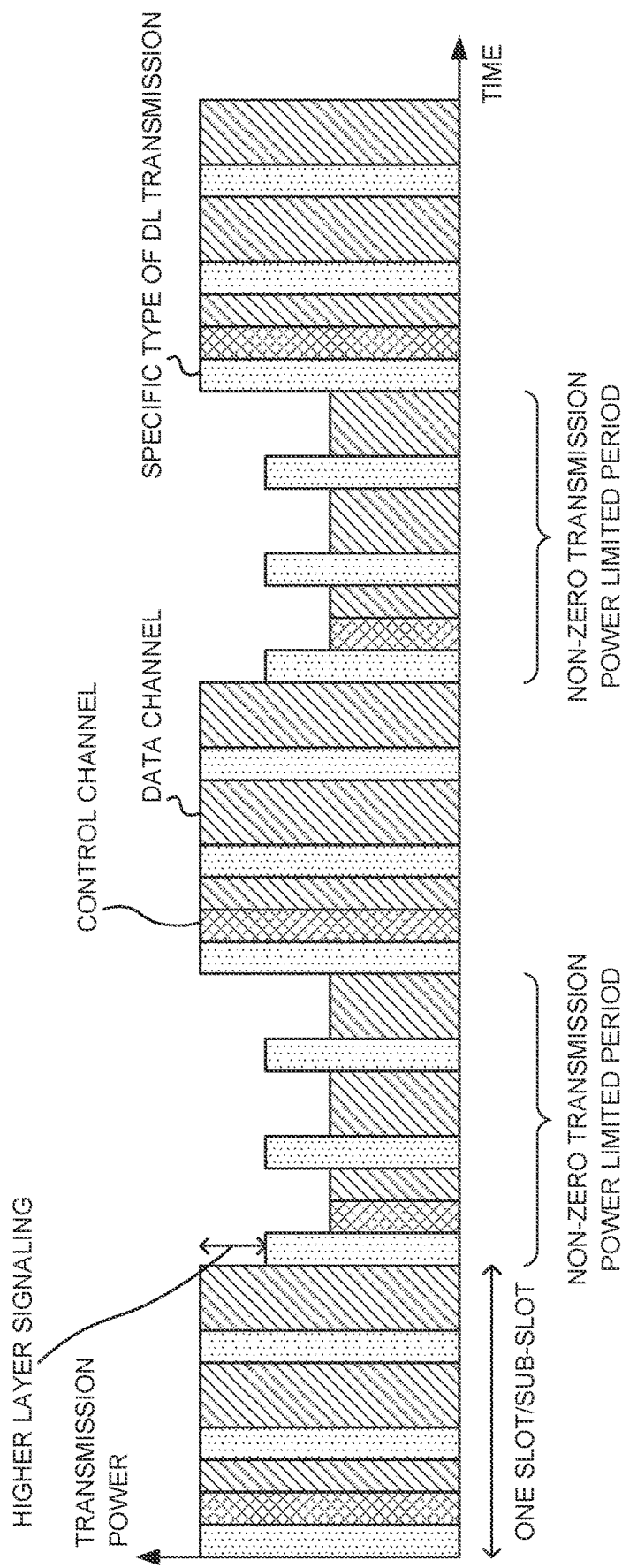
FIG. 20 is a diagram to show an example of a ratio of transmission power for the specific type of DL transmission in the limited period to transmission power for the specific type of DL transmission in a non-limited period.

As shown in FIG. 20, a parameter indicating a ratio (reduced quantity) of transmission power for the specific type of DL transmission in the limited period to transmission power for the specific type of DL transmission in the non-limited period may be configured using higher layer signaling.

A relative value between the power for the specific type of DL transmission in the limited period and the power for the specific type of DL transmission in the protected resources may be defined in a specification, or may be configured using at least one of higher layer signaling and broadcast information.

The SSB may be transmitted using the same resources as a neighboring cell, and the CSI-RS and the TRS need not be transmitted using the same resources as the neighboring cell. The specific type of DL transmission may be an SSB, and the non-specific type of DL transmission may include a CSI-RS and a TRS.

When the power for the specific type of DL transmission in the limited period is lower than the power for the specific type of DL transmission in the protected resources, quality of the specific type of DL transmission in the protected resources can be enhanced.

<<Time Domain Interference Control Method 4>>

The power for a given type of transmission in a local cell may be different from the power for the type of transmission in a licensed cell.

A relative value between the power for the given type of transmission in the local cell and the power for the type of transmission in the licensed cell may be defined in a specification, or may be configured using at least one of higher layer signaling and broadcast information. The given type of transmission may be at least one of an SSB, a CSI-RS, a TRS, a PDCCH, a PDSCH, a PUCCH, a PUSCH, a sounding reference signal (SRS), the specific type of DL transmission, and the non-specific type of DL transmission. The power may be transmission power, or may be received power. Power, energy, and EPRE may be interchangeably interpreted as each other. The relative value may be a difference, or may be a ratio.

For example, a parameter indicating a ratio of transmission power for the type of transmission in the local cell to transmission power for the given type of transmission in the licensed cell may be reported. For example, a parameter indicating a ratio of transmission power for the type of transmission in the licensed cell to transmission power for the given type of transmission in the local cell may be reported.

The transmission power for the given type of transmission in the local cell may be lower than the transmission power for the type of transmission in the licensed cell. In this case, interference from the local cell to the licensed cell is reduced, and thus communication quality of the licensed cell can be enhanced.

The transmission power for the given type of transmission in the licensed cell may be lower than the transmission power for the type of transmission in the local cell. In this case, interference from the licensed cell to the local cell is reduced, and thus communication quality of the local cell can be enhanced.

The power for the given type of transmission in the local cell in a given period may be different from the power for the type of transmission in the licensed cell in the period. The given period may be the limited period.

A relative value between the power for the given type of transmission in the local cell in the given period and the power for the type of transmission in the licensed cell in the period may be defined in a specification, or may be configured using at least one of higher layer signaling and broadcast information.

Some of time domain interference control methods 2, 3, and 4 may be combined together.

<<Time Domain Interference Control Method 5>>

At least one of the following assumptions 1 to 3 may be defined.

[Assumption 1]

The UE may assume that the limited period is not configured for at least one of the slot and the CC in which the specific type of DL transmission is performed.

For example, the UE may assume that the limited period is not configured for at least one of the slot and the CC in which the SSB is transmitted.

By preventing transmission of the SSB from being limited and the SSB from receiving interference in the limited period, quality deterioration of the SSB can be prevented. Consequently, performance deterioration of the initial access receiving influence of the SSB can be prevented.

[Assumption 2]

The UE may assume that the limited period is not configured for at least one of the time resources and the frequency resources in which the specific type of DL transmission is performed. The time resource may be at least one of a slot, a sub-slot, and a symbol. The frequency resource may be at least one of a physical resource block (PRB) and a physical resource element (PRE).

For example, the UE may assume that the limited period is not configured for at least one of the time resources and the frequency resources in which the SSB is transmitted. The time resource may be at least one of a slot, a sub-slot, and a symbol. The frequency resource may be at least one of a physical resource block (PRB) and a physical resource element (PRE).

With the DL transmission other than the SSB being limited in the limited period, interference to neighboring cells can be reduced.

[Assumption 3]

The UE may assume that the limited period is applied to at least one of the time resources and the frequency resources in which the specific type of DL transmission is performed.

For example, the UE may assume that the limited period is applied to at least one of the time resources and the frequency resources in which the SSB is transmitted.

Figure 21:
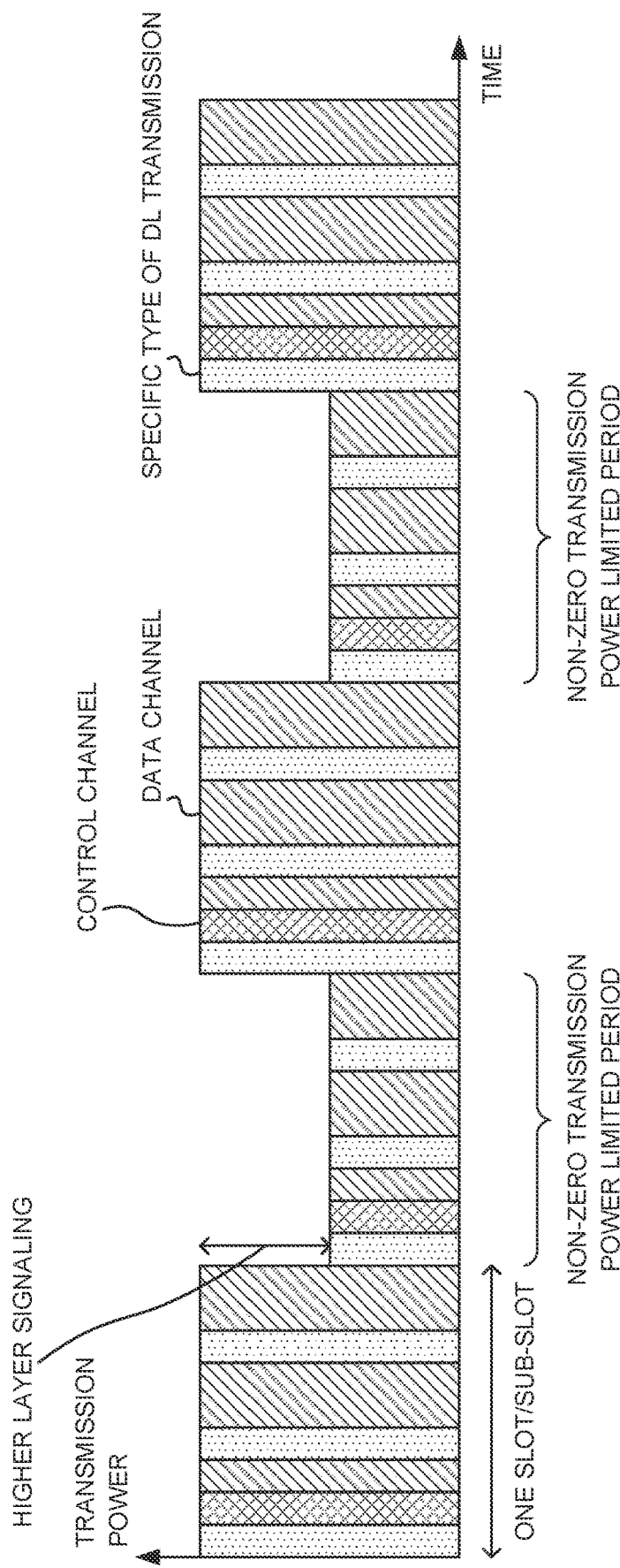
FIG. 21 is a diagram to show an example of a ratio of transmission power in the limited period to transmission power in the non-limited period.

As shown in FIG. 21, a parameter indicating a ratio (reduced quantity) of transmission power in the limited period to transmission power in the non-limited period may be configured using higher layer signaling. Transmission power for the SSB, the control channel, and the data channel may follow the ratio.

With the DL transmission including the SSB being limited in the limited period, interference to neighboring cells can be reduced.

<<Time Domain Interference Control Method 6>>

The UE may be notified of the relative value in at least one of time domain interference control methods 2, 3, and 4, by using at least one of higher layer signaling and the MAC CE.

The UE may be independently (separately) notified of the relative value in at least two of time domain interference control methods 2, 3, and 4, by using at least one of higher layer signaling and the MAC CE.

The UE may be jointly notified of the relative value in at least two of time domain interference control methods 2, 3, and 4, by using at least one of higher layer signaling and the MAC CE.

The UE may be configured with a plurality of candidates for the relative value in at least one of time domain interference control methods 2, 3, and 4 by using higher layer signaling, and one of the plurality of candidates may be selected or activated for the UE by using the MAC CE.

For example, as shown in FIG. 22, the UE may be configured with a plurality of candidates for the combination of a ratio of the power for the non-specific type of DL transmission in the limited period to the power for the non-specific type of DL transmission in the non-limited period and a ratio of the power for the specific type of DL transmission in the limited period to the power for the specific type of DL transmission in the non-limited period, by using higher layer signaling. One of the plurality of candidates may be activated for the UE, by using the MAC CE.

Figure 23:
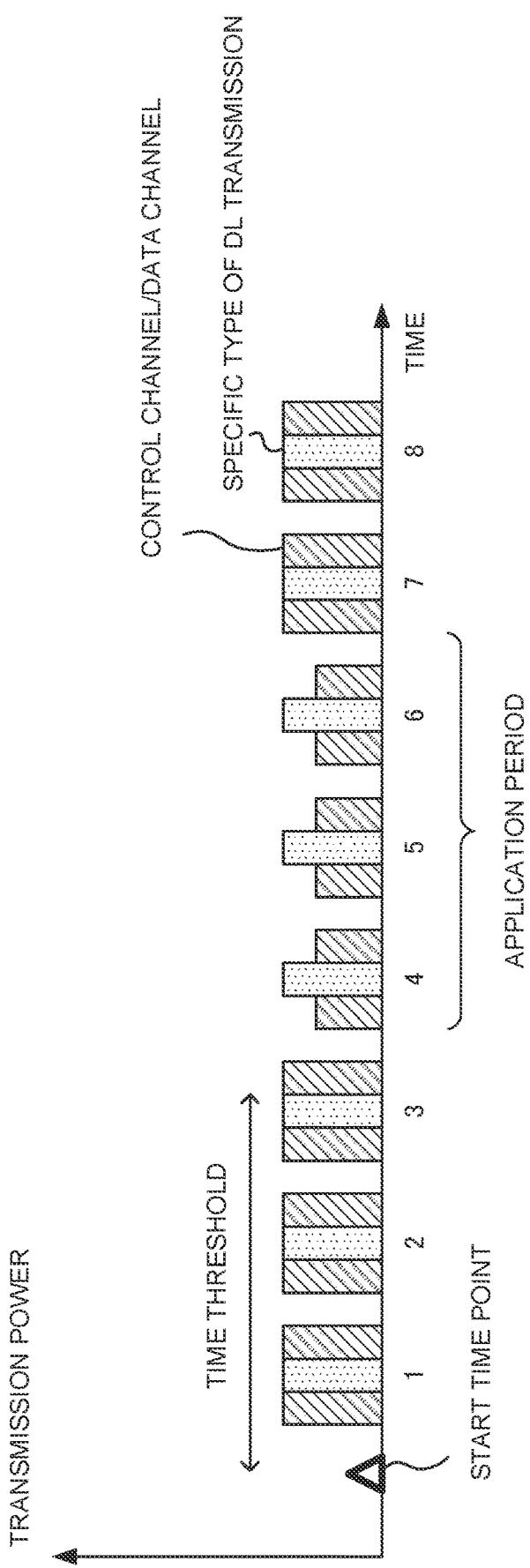
FIG. 23 is a diagram to show an example of application of the relative value.

When the relative value is indicated using the MAC CE, as shown in FIG. 23, a threshold of time from a start time point related to the indication of the relative value to a time point when the relative value is applied may be defined in a specification, may be configured using higher layer signaling, or may be reported from the UE as UE capability information. The threshold may be configured using higher layer signaling, based on the report of the UE capability information from the UE.

The start time point may be based on reception of DCI for scheduling the PDSCH that carries the MAC CE. The start time point may be the first symbol, slot, or sub-slot of the DCI, or the last symbol, slot, or sub-slot of the DCI.

The start time point may be based on reception of the PDSCH that carries the MAC CE. The start time point may be the first symbol, slot, or sub-slot of the PDSCH, or the last symbol, slot, or sub-slot of the PDSCH. When the PDSCH is applied over a plurality of slots or a plurality of sub-slots, the start time point may be the first slot or sub-slot of the PDSCH, or may be the last slot or sub-slot of the PDSCH.

The start time point may be based on transmission of the ACK for the PDSCH that carries the MAC CE. The start time point may be the first symbol, slot, or sub-slot of the ACK, or the last symbol, slot, or sub-slot of the ACK.

The relative value may be applied over an application period. The application period may be defined in a specification or may be configured using higher layer signaling as the number of slots, sub-slots, or transmission opportunities. The application period may be defined in a specification or may be configured using higher layer signaling as time. The application period may be up to when the relative value is updated using at least one of higher layer signaling, the MAC CE, and DCI.

According to the operation described above, at least one of configuration, activation, indication, and application of the relative value can be appropriately performed.

<<Time Domain Interference Control Method 7>>

The UE may be notified of (configured, activated) a plurality of candidates for the relative value in at least one of time domain interference control methods 2, 3, and 4 by using at least one of higher layer signaling and the MAC CE, and may be notified of (indicated, selected) one of the plurality of candidates using DCI.

For example, as shown in FIG. 24, the UE may be configured with a plurality of candidates for the combination of a ratio of the power for the non-specific type of DL transmission in the limited period to the power for the non-specific type of DL transmission in the non-limited period and a ratio of the power for the specific type of DL transmission in the limited period to the power for the specific type of DL transmission in the non-limited period, by using higher layer signaling. The plurality of candidates may be respectively associated with a plurality of code points (field values) of a specific field in the DCI. One of the plurality of candidates may be indicated for the UE, by using DCI.

According to the operation described above, interference control can be dynamically performed depending on a situation of scheduling, a situation of dynamic TDD (UL-DL configuration, slot format (slot format indicator (SFI))), or the like.

Figure 25:
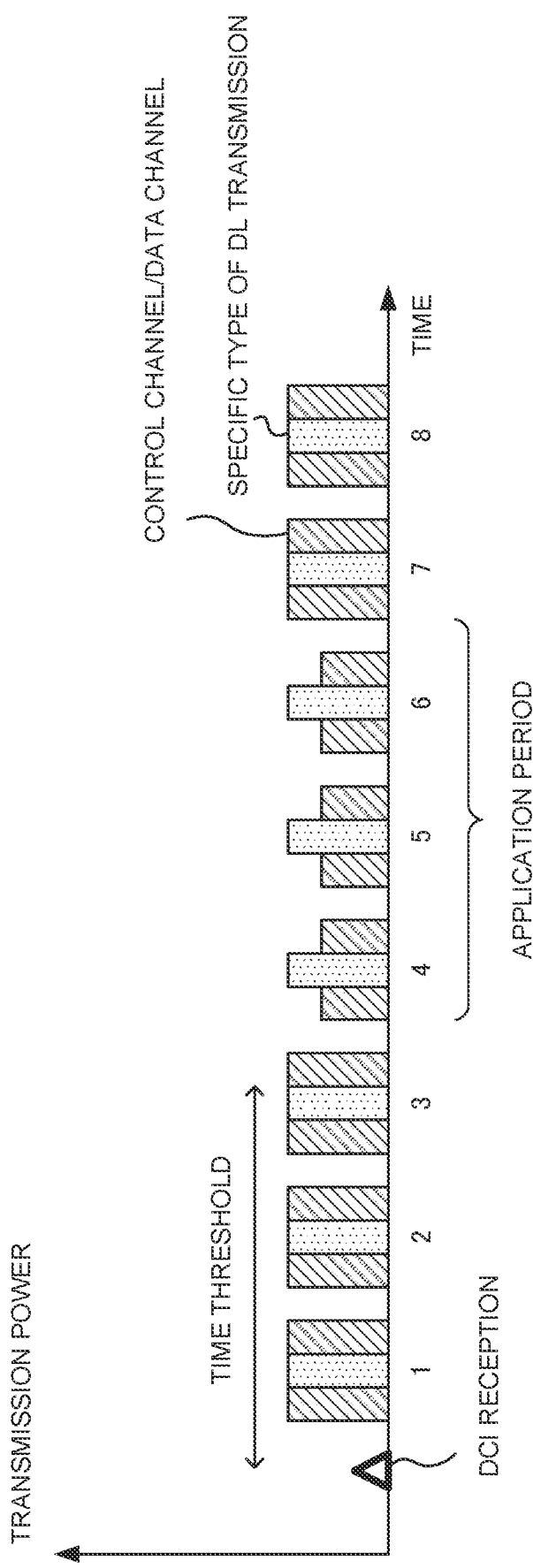
FIG. 25 is a diagram to show another example of application of the relative value.

As shown in FIG. 25, a threshold of time from a start time point related to the indication of the relative value using the DCI to a time point when the relative value is applied may be defined in a specification, may be configured using higher layer signaling, or may be reported from the UE as UE capability information. The threshold may be configured using higher layer signaling, based on the report of the UE capability information from the UE.

The start time point may be based on reception of DCI. The start time point may be the first symbol, slot, or sub-slot of the DCI, or the last symbol, slot, or sub-slot of the DCI.

The relative value may be applied over an application period. The application period may be defined in a specification or may be configured using higher layer signaling as the number of slots, sub-slots, or transmission opportunities. The application period may be defined in a specification or may be configured using higher layer signaling as time. The application period may be up to when the relative value is updated using at least one of higher layer signaling, the MAC CE, and DCI.

According to the operation described above, at least one of configuration, activation, indication, and application of the relative value can be appropriately performed.

<<Time Domain Interference Control Method 8>>

The UE may cancel DL transmission (interference) of interfering resources. DL transmission of the interfering resources may be the specific type of DL transmission from at least one of a higher cell, a macro cell, a neighboring cell, a configured CC, a configured BWP, and a configured business operator.

The UE may cancel DL transmission of interfering resources in a manner similar to the CRS interference canceler of LTE.

The UE may be configured with information related to the interfering resources, by using higher layer signaling. The information related to the interfering resources may be at least one of the number of neighboring cells, an ID of at least one of the CC, the BWP, and the business operator, the number of ports for the specific type of DL transmission (the number of ports is 1 when the specific type of DL transmission is the SSB), at least one of a slot, a sub-slot, and a symbol of specific resources, at least one of a slot, a sub-slot, and a symbol with the limited period, the relative value in at least one of time domain interference control methods 2, 3, and 4, resource positions of the specific type of DL transmission, and a sequence of the specific type of DL transmission.

With the UE being notified of such information, DL transmission of the interfering resources can be appropriately cancelled.

When the UE is configured with interference cancellation, the UE may cancel DL transmission of the interfering resources. With this, measurement accuracy and channel quality in the protected resources can be enhanced.

The UE may report at least one of whether or not interference cancellation can be performed and a maximum number of resources (a cell, a CC, a BWP, or the like) that can be cancelled as UE capability information. The UE may be configured with at least one of whether or not interference cancellation is applied and the number of resources to be cancelled, based on the reported UE capability information.

The UE may assume that resources of the SSB of a connected cell may be the same as resources of the SSB of a neighboring cell. The UE may assume that resources of the CSI-RS and the TRS of a connected cell are the same as resources of the CSI-RS and the TRS of a neighboring cell. In other words, resources of data of a neighboring cell collide (interfere) with the CSI-RS and the TRS of the cell in question.

The interfering resources may be resources of the SSB. The interference cancellation is particularly effective for the SSB of a neighboring cell.

<<Time Domain Interference Control Method 9>>

The UE may receive the SIB1, using UE-specific RRC signaling in the interfered resources. The interfered resources may be at least one of a cell that receives interference from another cell, a CC that receives interference from another CC, and a BWP that receives interference from another BWP. The interfered resources may be resources in a cell in which the limited period is not configured, or may be protected resources.

The UE may receive information related to the SSB and broadcast information (for example, the PBCH), using UE-specific RRC signaling in the interfered resources.

The UE may receive the SIB1, using UE-specific RRC signaling in the protected resources. The UE may receive the SIB1 transmitted in the specific type of DL transmission in the protected resources, using UE-specific RRC signaling in the non-specific type of DL transmission in the protected resources.

According to the operation described above, the UE can appropriately receive the SIB1 that receives interference with the specific type of DL transmission in the limited period.

<<Time Domain Interference Control Method 10>>

A limited period pattern indicating the limited period may be transmitted from a base station (for example, a gNB) to another base station, via a wired interface (backhaul (X2 interface)) or a radio interface (Integrated Access Backhaul (IAB)).

Figure 26:
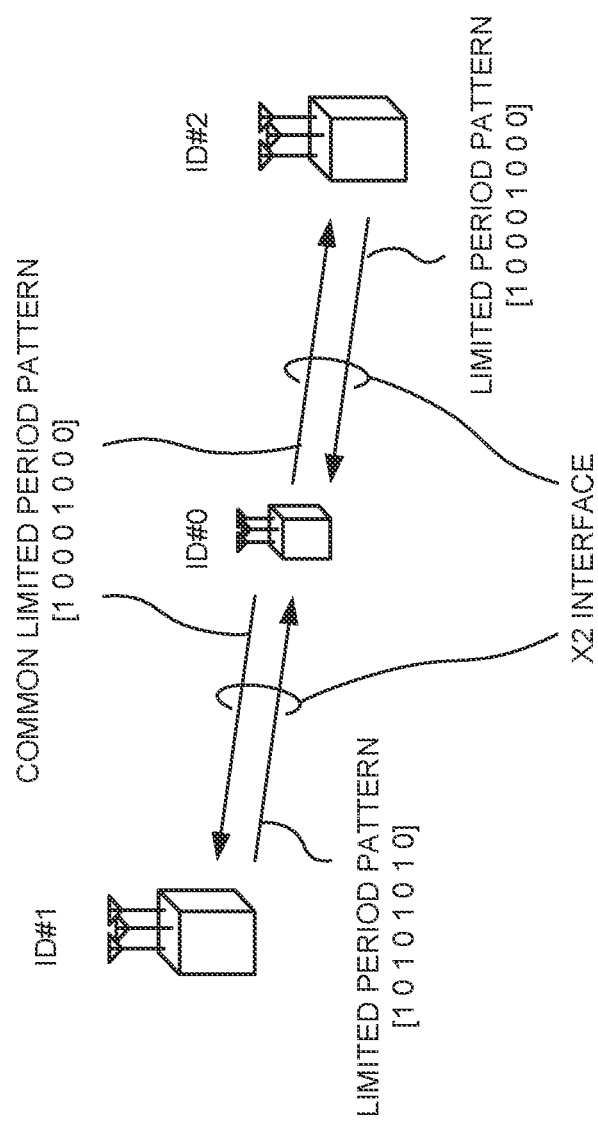
FIG. 26 is a diagram to show an example of a common limited period pattern.

It is preferable that a base station (interfered base station) that receives interference know the limited period pattern of a base station (interfering base station) that gives interference. As shown in FIG. 26, between a plurality of base stations (IDs #1 and #2) that give interference to the same base station (ID #0), in order to integrate the limited period patterns, a common limited period pattern may be fed back to a plurality of macro eNBs. For example, the interfered base station (ID #0) may calculate the common limited period pattern by performing AND (product) operation on the limited period patterns from the plurality of interfering base stations (IDs #1 and #2).

<<Time Domain Interference Control Method 11>>

The UE may measure the CSI in resources (a base station, a CC, a BWP, an ID, or the like) in which the limited period is not configured.

Figure 27:
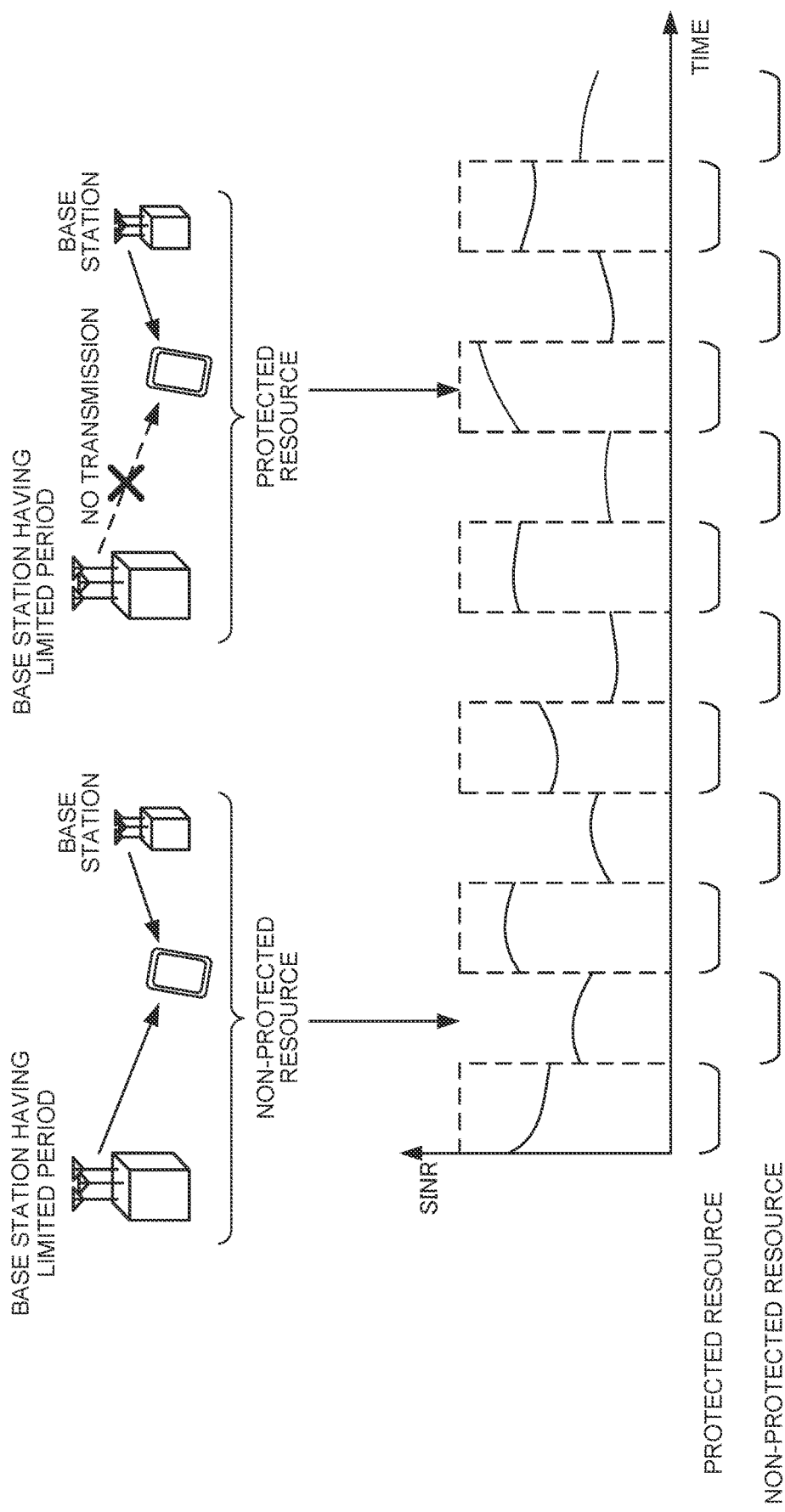
FIG. 27 is a diagram to show an example of measurement in the limited periods.

As shown in FIG. 27, the UE configured with the limited period obtains different channel quality levels in the protected resources and the non-protected resources. In order for the UE to estimate CQI for both of the protected resources and the non-protected resources, measurement resources are transmitted (configured) to the UEs connected to the base station having the limited period and the base station not having the limited period.

The UE may be configured with information related to the measurement resources, by using higher layer signaling. The information related to the measurement resources may be at least one parameter of the number of neighboring cells, an ID of at least one of the CC, the BWP, and the business operator, the number of ports for the specific type of DL transmission (the number of ports is 1 when the specific type of DL transmission is the SSB), at least one of a slot, a sub-slot, and a symbol of specific resources, at least one of a slot, a sub-slot, and a symbol with the limited period, the relative value in at least one of time domain interference control methods 2, 3, and 4, resource positions of the specific type of DL transmission, a sequence of the specific type of DL transmission, and a numerology of a neighboring cell.

When DL transmission being interference is data, since it is difficult for the UE to cancel the interference, the UE is configured with a parameter related to the measurement resources and the limited period, and when the UE performs measurement of interference power in the measurement resources, the UE may correct the interference power by using information related to the limited period.

For example, the notified parameter may be a ratio of transmission power for the specific type of DL transmission in the limited period of a neighboring cell to transmission power for the specific type of DL transmission in the non-limited period of the neighboring cell.

Figure 28:
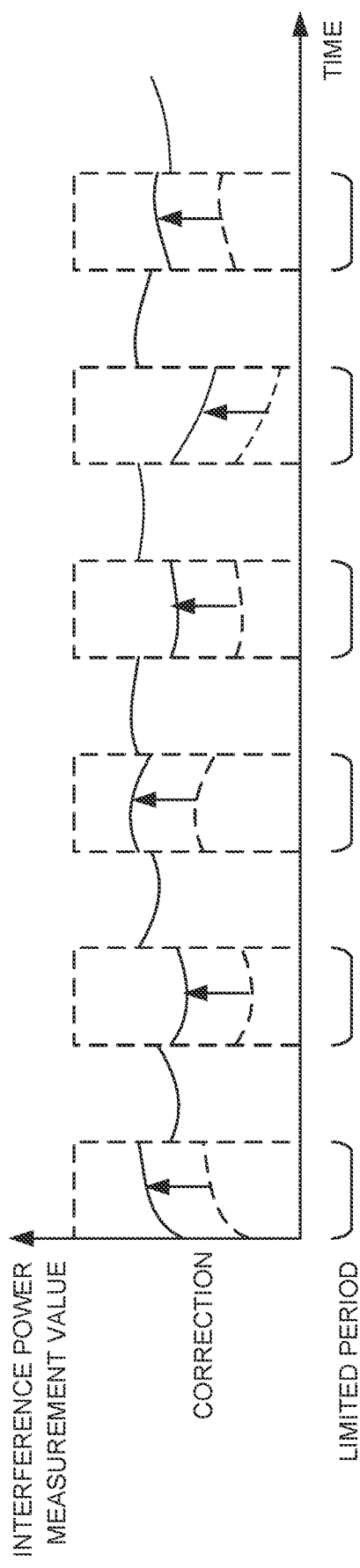
FIG. 28 is a diagram to show an example of correction of interference measurement.

For example, the following case is assumed: in a neighboring cell configured with the limited period in which the specific type of DL transmission is the SSB and the non-specific type of DL transmission is a data channel and a control channel, notified to the UE is that a ratio of transmission power for the data channel and the control channel in the limited period to the transmission power in the non-limited period is −3 dB and a ratio of transmission power for the SSB in the limited period to the transmission power in the non-limited period is −1 dB. When the UE measures the interference power in interference measurement resources corresponding to the limited period of a neighboring cell, regardless of whether or not the interference measurement resources are resources of the SSB, as shown in FIG. 28, the UE may perform correction of "measured interference power+3 dB", based on the ratio of −3 dB configured for the data channel and the control channel (in order to compensate for the reduced quantity of the transmission power in the limited period).

When time resources of the SSB of a neighboring cell and time resources of the SSB of the cell in question are the same, the UE need not perform correction of the interference power in the time resources of the SSB, and may correct the interference power by using the ratio of −1 dB configured for the SSB.

When the UE is notified that different relative values are configured for the limited periods of a plurality of neighboring cells, the UE may correct the interference power, based on one of the following correction methods 1 to 3.

[Correction Method 1]

The UE may be notified from the NW of a dominant cell out of a plurality of neighboring cells. The dominant cell may be a cell that gives the greatest interference. The UE may be configured with information related to the limited period of the dominant cell. The UE may correct the interference power by using a relative value configured for the limited period of a configured cell.

[Correction Method 2]

The UE may measure the SSBs of a plurality of neighboring cells, identify a cell having the SSB of the highest interference power (received power) out of the plurality of neighboring cells, and correct the interference power by using a relative value configured for the limited period of the identified cell. The UE may measure the SSB only in the non-limited period of the plurality of neighboring cells.

[Correction Method 3]

The UE may be configured with interference measurement resources respectively for a plurality of neighboring cells, measure interference power in the configured interference measurement resources, identify a cell having the highest interference power (received power) out of the plurality of neighboring cells, and correct the interference power by using a relative value configured for the limited period of the identified cell. The UE may measure the interference power in the interference measurement resources of only the non-limited period of the plurality of neighboring cells.

Figure 29:
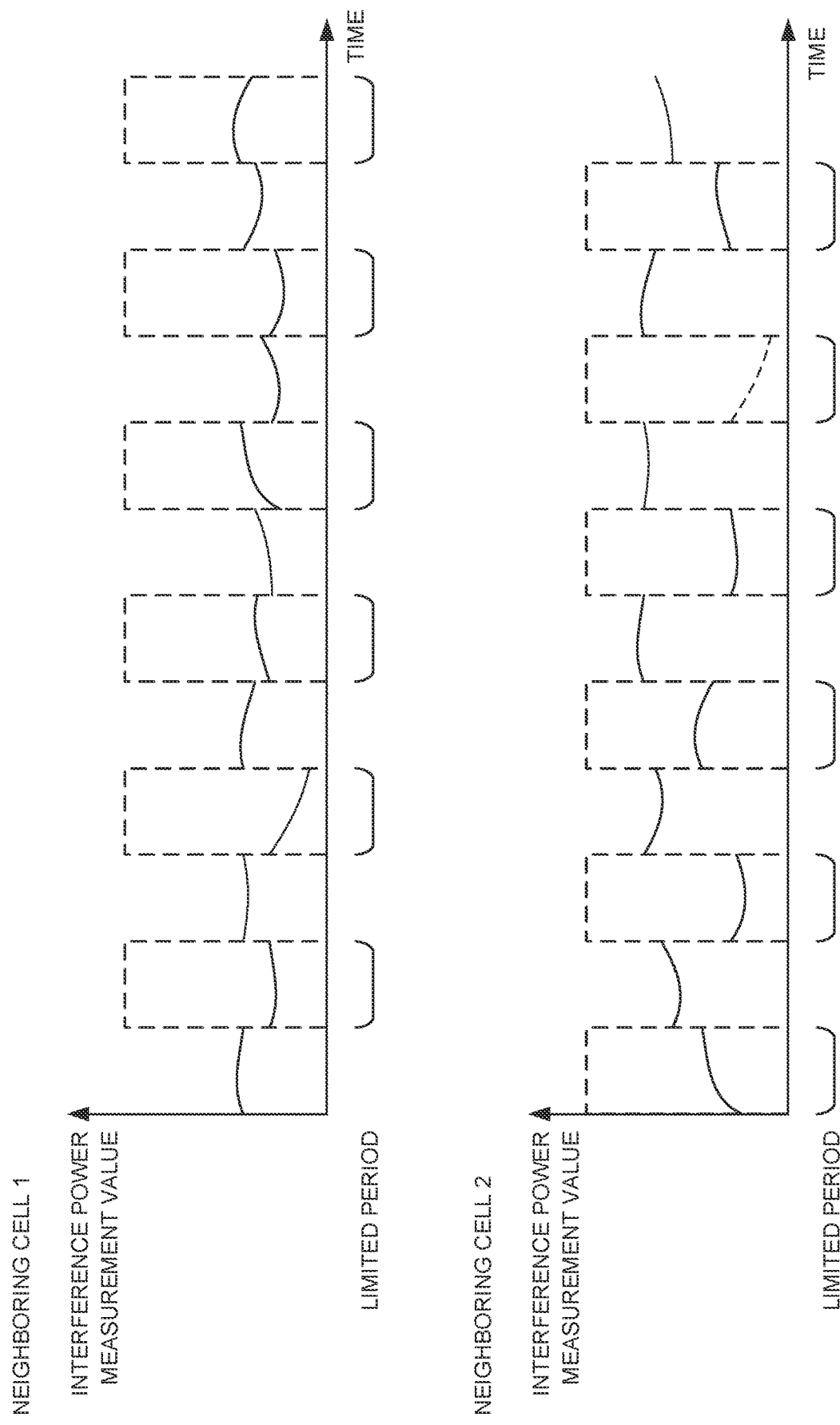
FIG. 29 is a diagram to show an example of correction of interference measurement for a plurality of neighboring cells.

For example, in FIG. 29, average interference power of neighboring cell 1 (interfering cell 1) is 1 dB, and a relative value configured for the limited period of neighboring cell 1 is −2 dB. Average interference power of neighboring cell 2 (interfering cell 2) is 5 dB, and a relative value configured for the limited period of neighboring cell 2 is −3 dB. The average interference power of neighboring cell 2 is the highest, and thus the relative value of neighboring cell 2 is used. In other words, based on the relative value of −3 dB in neighboring cell 2, the UE adds +3 dB to each of the interference power in the limited period of neighboring cell 1 and the interference power in the limited period of neighboring cell 2 to thereby correct the interference power.

According to the present embodiment, interference between cells can be reduced, and communication quality can be enhanced.

Third Embodiment

A limited number of UEs may be able to connect to a local cell (local NW, femto cell). Some UEs may be required to connect to the licensed cell (licensed NW), even when the local cell is the best cell.

Figure 30A:
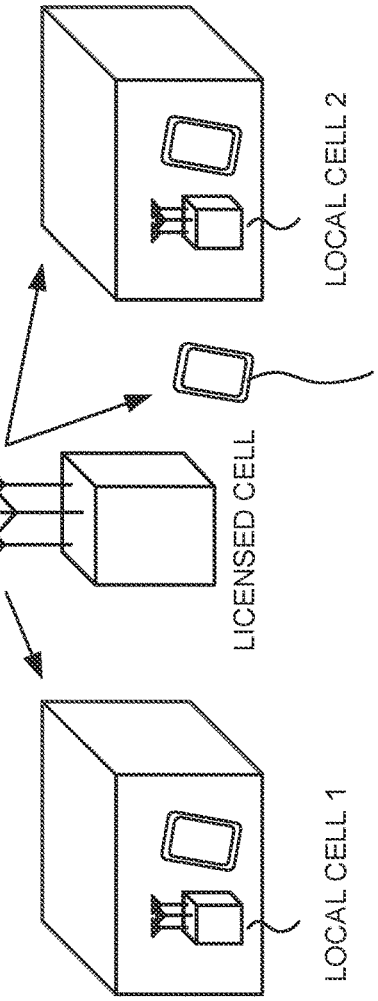
FIG. 30A and FIG. 30B are each a diagram to show an example of DL power setting of local cells.
Figure 30B:
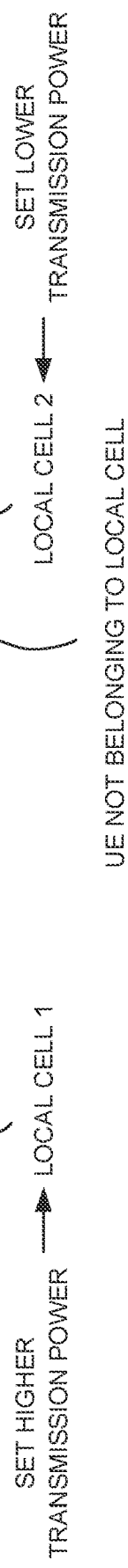

Influence of interference from the local cell may depend on a received signal level from a serving licensed cell. By setting transmission power from the licensed cell according to the received signal level of the local cell (downlink power setting), the influence is reduced. For example, as shown in FIG. 30A, when interference from the licensed cell to local cell 1 is greater than interference from the licensed cell to local cell 2, at least one of the transmission power of local cell 1 and the transmission power of local cell 2 may be set so that the transmission power of local cell 1 is higher than the transmission power of local cell 2 as shown in FIG. 30B.

The UE may use one of the following PDCCH monitoring methods 1 and 2 for the local cell.

<<PDCCH Monitoring Method 1>>

The UE (local UE) connected to a local cell may be configured with at least one of a CORESET and a search space dedicated to the local UE (local cell).

The local UE may detect DCI by monitoring the DCI (PDCCH), by using a configured CORESET and search space. With the DCI, a UL or DL data channel may be scheduled.

It can be assumed that the local cell and the licensed cell are present at locations different from each other. The UE may assume that beams (QCL, TCI, spatial relation) are different between the local cell and the licensed cell. The UE may assume that search spaces are different between the local cell and the licensed cell.

<<PDCCH Monitoring Method 2>>

The local UE need not be configured with any of a CORESET or a search space dedicated to the local UE (local cell).

The local UE may detect DCI by monitoring the DCI (PDCCH), by using a configured CORESET and SS. With the DCI, a UL or DL data channel may be scheduled.

A CRC in the DCI may be scrambled with an RNTI dedicated to the local UE (local cell). A field in the DCI may indicate whether or not it is DCI from the local cell, or whether or not it is DCI to be transmitted to the local UE.

According to the present embodiment, even when the licensed cell and the local cell coexist, the UE can appropriately receive a signal from the local cell.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 31:
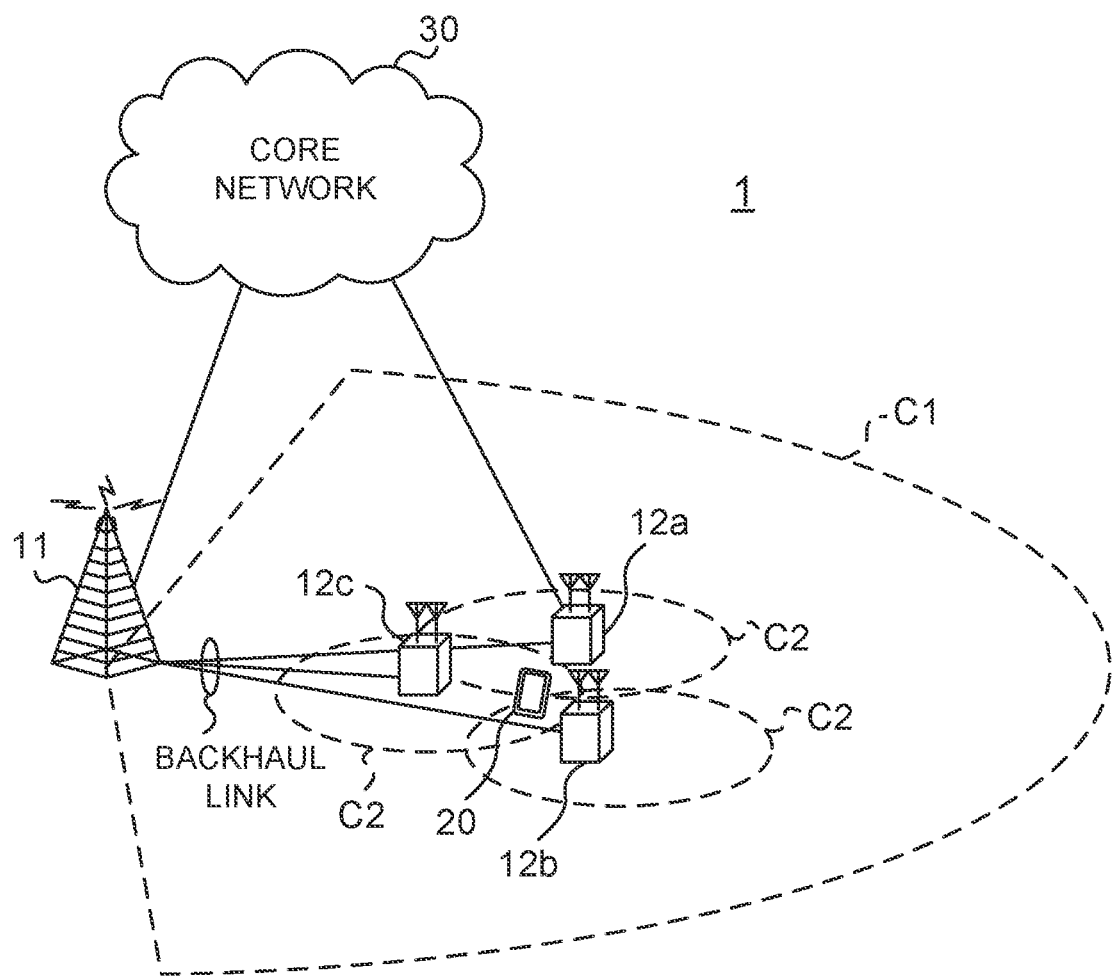
FIG. 31 is a diagram to show an example of a schematic structure of a radio communication system according to one embodiment.

FIG. 31 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 32:
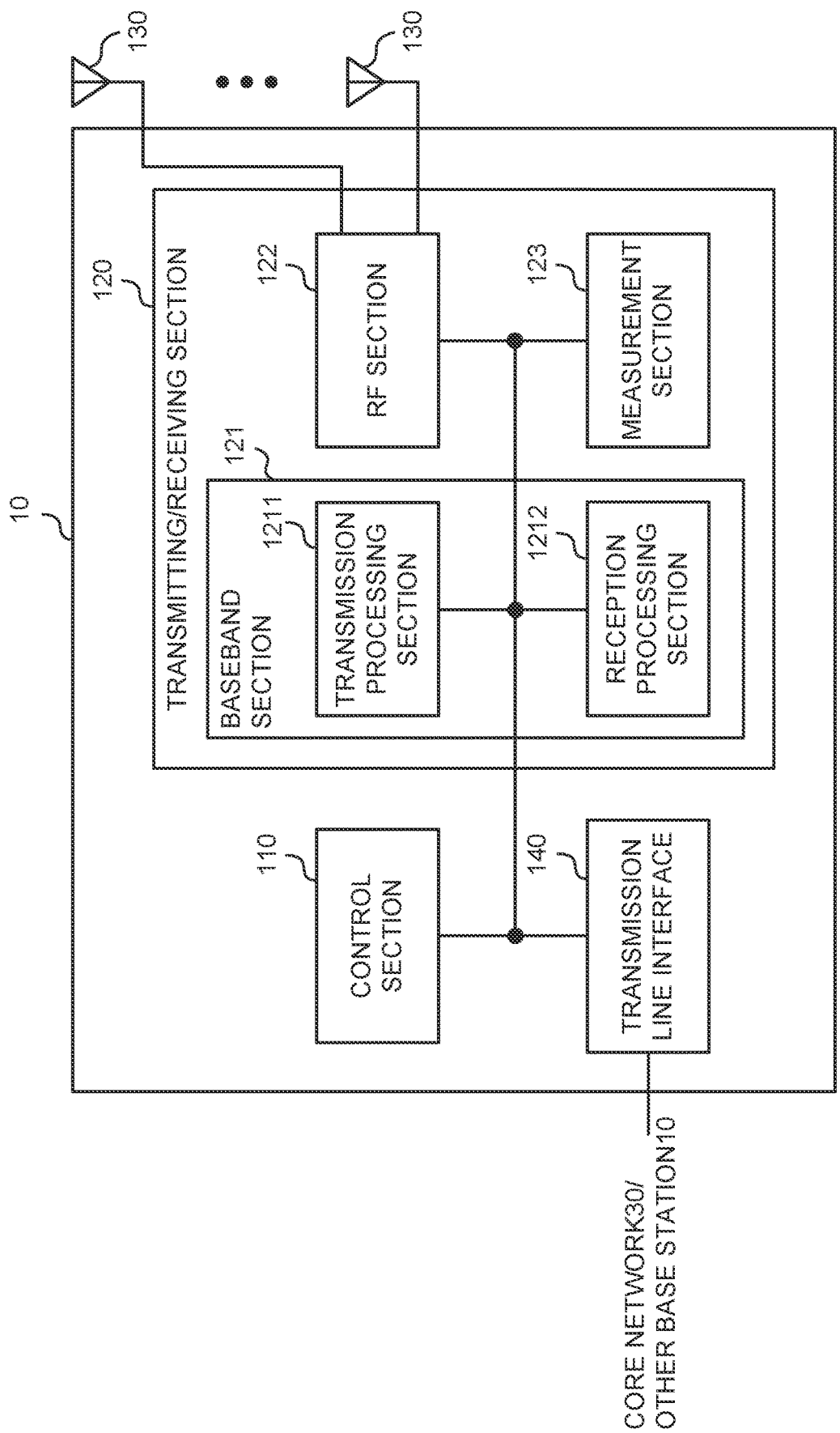
FIG. 32 is a diagram to show an example of a structure of a base station according to one embodiment.

FIG. 32 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit a reference signal (for example, an SSB, a CSI-RS, or the like). The transmitting/receiving section 120 may transmit information (MAC CE or DCI) indicating a TCI state for specific DL transmission. The TCI state may indicate at least one of a reference signal (for example, an SSB, a CSI-RS, or the like), a QCL type, and a cell in which the reference signal is transmitted. The TCI state may indicate one or more reference signals. The one or more reference signals may include a reference signal of QCL type A, or may include a reference signal of QCL type D.

The control section 110 may assume that a first reference signal of spatial relation of specific uplink transmission (for example, an SRS, a PUCCH, a PUSCH, or the like) is a second reference signal (for example, an SSB or a CSI-RS) of a transmission control indication (TCI) state or of QCL type D in quasi-co-location (QCL) assumption of a specific downlink channel (for example, a PDCCH, a PDSCH, or the like).

(User Terminal)

Figure 33:
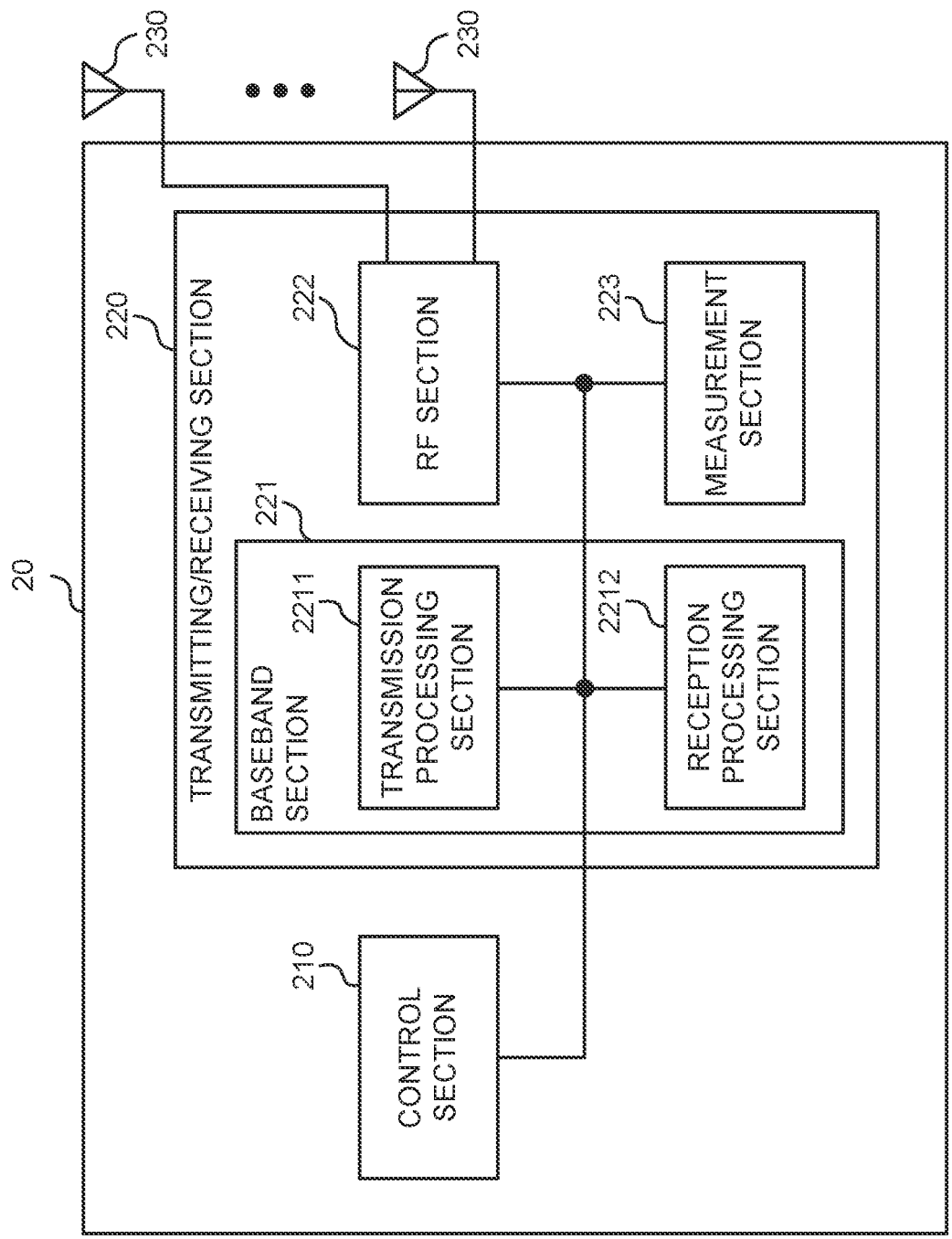
FIG. 33 is a diagram to show an example of a structure of a user terminal according to one embodiment.

FIG. 33 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The control section 210 may use a first cell (for example, one of a licensed cell and a local cell) and a second cell (for example, one of a licensed cell and a local cell) of business operators different from each other. The transmitting/receiving section 220 may receive downlink transmission having transmission power different depending on at least one of a business operator (for example, a business operator ID), frequency (for example, at least one of a CC and a BWP), time (for example, at least one of a slot, a sub-slot, a symbol, and time from indication), and interference in the first cell and the second cell.

At least one of an expression and a parameter (for example, P0 or α) related to uplink transmission power may be different between the first cell and the second cell (first embodiment).

In at least one of the first cell and the second cell, transmission power for a first type (for example, a non-specific type or a given type) of the downlink transmission in a configured period (for example, a limited period) may be different from at least one of transmission power for the first type of the downlink transmission in a period (for example, a non-limited period) other than the configured period and transmission power for a second type (for example, a specific type) of the downlink transmission in the configured period (second embodiment).

The transmitting/receiving section 220 may receive information related to transmission power for the downlink transmission in the configured period. The control section 210 may correct measurement results of interference power, based on the information (second embodiment/time domain interference control method 11).

The transmitting/receiving section 220 may receive a downlink control channel by using at least one of a control resource set (CORESET) and a search space dedicated to the second cell (for example, a local cell) (third embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 34:
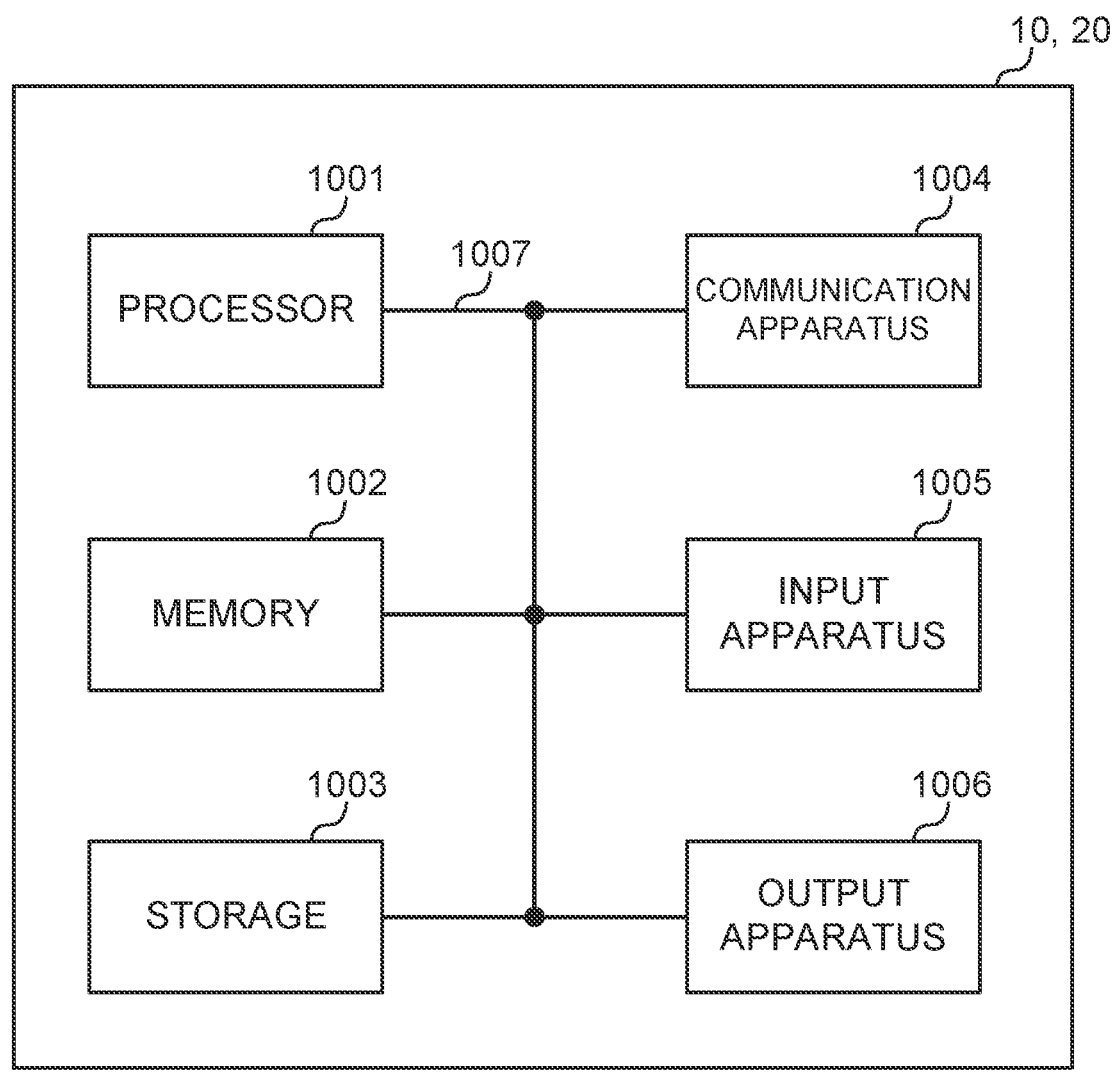
FIG. 34 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 34 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving objector a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a control section that uses a first cell and a second cell of business operators different from each other; and
   a receiving section that receives downlink transmission having transmission power different depending on at least one of a business operator, frequency, time, and interference in the first cell and the second cell,
   wherein an expression related to uplink transmission power is defined by an expression different transmission power density depending on frequency and different between the first cell and the second cell,
   wherein in at least one of the first cell and the second cell, transmission power for a first type of the downlink transmission in a configured period is 0 and different from transmission power for a second type of the downlink transmission in the configured period,
   wherein the transmission power for the first type of the downlink transmission is at least one of an L1/L2 control signal and a PDCCH,
   wherein the receiving section receives information related to transmission power for the downlink transmission in the configured period, and when the control section is notified, based on the information, that a relative value of a neighboring cell is configured, the control section corrects, based on the relative value, measurement results of interference power, and
   wherein the relative value comprises a ratio of a first transmission power in the configured period of the neighboring cell to a second transmission power in a period other than the configured period of the neighboring cell.

2. The terminal according to claim 1, wherein the first cell and the second cell are allocated different frequency bands.

3. The terminal according to claim 2, wherein the receiving section receives a downlink control channel by using at least one of a control resource set and a search space dedicated to the second cell.

4. The terminal according to claim 1, wherein the receiving section receives a downlink control channel by using at least one of a control resource set and a search space dedicated to the second cell.

5. A radio communication method for a terminal, the radio communication method comprising:
   using a first cell and a second cell of business operators different from each other;
   receiving downlink transmission having transmission power different depending on at least one of a business operator, frequency, time, and the terminal in the first cell and the second cell,
   wherein an expression related to uplink transmission power is defined by an expression different transmission power density depending on frequency and different between the first cell and the second cell,
   wherein in at least one of the first cell and the second cell, transmission power for a first type of the downlink transmission in a configured period is 0 and different from transmission power for a second type of the downlink transmission in the configured period,
   wherein the transmission power for the first type of the downlink transmission is at least one of an L1/L2 control signal and a PDCCH;
   receiving information related to transmission power for the downlink transmission in the configured period; and
   correcting, based on a relative value, measurement results of interference power when the terminal is notified, based on the information, that the relative value of a neighboring cell is configured, and
   wherein the relative value is a ratio of a first transmission power in the configured period of the neighboring cell to a second transmission power in a period other than the configured period of the neighboring cell.

* * * * *